(12) United States Patent
Baunach et al.

(10) Patent No.: US 12,436,668 B2
(45) Date of Patent: Oct. 7, 2025

(54) SYSTEMS, DEVICES AND METHODS FOR ELECTRONIC DETERMINATION AND COMMUNICATION OF LOCATION INFORMATION

(71) Applicants: Brandon Ly Baunach, Portland, OR (US); Jeremiah James Baunach, Spokane, WA (US)

(72) Inventors: Brandon Ly Baunach, Portland, OR (US); Jeremiah James Baunach, Spokane, WA (US)

( * ) Notice: Subject to any disclaimer, the term of this patent is extended or adjusted under 35 U.S.C. 154(b) by 0 days.

(21) Appl. No.: 19/051,537

(22) Filed: Feb. 12, 2025

(65) Prior Publication Data
US 2025/0181223 A1    Jun. 5, 2025

Related U.S. Application Data

(63) Continuation of application No. 17/157,772, filed on Jan. 25, 2021, now abandoned, which is a (Continued)

(51) Int. Cl.
*G06F 3/04842* (2022.01)
*G06F 3/0482* (2013.01)
(Continued)

(52) U.S. Cl.
CPC ........ *G06F 3/04842* (2013.01); *G06F 3/0482* (2013.01); *G06F 3/04883* (2013.01); *G06F 16/953* (2019.01); *G06F 40/166* (2020.01); *H04L 51/222* (2022.05); *H04L 51/52* (2022.05); *H04M 1/72436* (2021.01); *H04M 1/72457* (2021.01); *H04M 2201/42* (2013.01)

(58) Field of Classification Search
CPC ............... G06F 3/0482; G06F 3/04883; G06F 16/953; G06F 40/166; H04M 1/72436; H04M 1/72457; H04L 51/222; H04L 51/52
See application file for complete search history.

(56) References Cited

U.S. PATENT DOCUMENTS

| 10,191,654 B2 | 1/2019 | Clements et al. |
| 2003/0200192 A1 | 10/2003 | Bell et al. |
| 2006/0293903 A1 | 12/2006 | Ramanathan et al. |

(Continued)

*Primary Examiner* — Seth A Silverman
(74) *Attorney, Agent, or Firm* — Jeremiah J. Baunach; Frontier IP Law PLLC

(57) ABSTRACT

A texting or messaging application may automatically insert relevant address or location information into the message as the user is typing the message, or shortly thereafter. A menu of selectable addresses or place names may also be presented to the user for insertion into the message as the user is typing the message. Such insertion may be based on a place name typed by the user or a type or category of place typed by the user in the message. Such relevant location information may instead be inserted automatically by the system on the recipient's device when the recipient receives the message. The system may also automatically generate and send a selectable calendar item including the address, date and time and attendees, based on information extracted from the message and previous relevant messages, as the message is being typed or upon sending the message.

23 Claims, 14 Drawing Sheets

Related U.S. Application Data continuation of application No. 16/728,508, filed on Dec. 27, 2019, now Pat. No. 10,928,996.

(60) Provisional application No. 62/785,995, filed on Dec. 28, 2018.

(51) Int. Cl.

| | | |
|---|---|---|
| *G06F 3/04883* | (2022.01) | |
| *G06F 16/953* | (2019.01) | |
| *G06F 40/166* | (2020.01) | |
| *H04L 51/222* | (2022.01) | |
| *H04L 51/52* | (2022.01) | |
| *H04M 1/72436* | (2021.01) | |
| *H04M 1/72457* | (2021.01) | |

(56) References Cited

U.S. PATENT DOCUMENTS

| | | |
|---|---|---|
| 2008/0133599 A1 | 6/2008 | Stewart et al. |
| 2008/0147472 A1* | 6/2008 | Hitz ............... G06Q 10/1093 705/7.14 |
| 2009/0125228 A1 | 5/2009 | Dicke et al. |
| 2011/0137989 A1 | 6/2011 | Kiciman et al. |
| 2011/0143774 A1 | 6/2011 | Mcnamara et al. |
| 2011/0161427 A1 | 6/2011 | Fortin et al. |
| 2011/0197200 A1 | 8/2011 | Huang et al. |
| 2011/0320548 A1* | 12/2011 | Jonsson ............ G06F 3/0237 704/9 |
| 2012/0058782 A1 | 3/2012 | Li |
| 2012/0127082 A1 | 5/2012 | Kushler et al. |
| 2014/0101553 A1 | 4/2014 | Nagel |
| 2014/0173460 A1 | 6/2014 | Kim |
| 2015/0347983 A1* | 12/2015 | Jon ............... G06F 3/0488 705/7.19 |
| 2016/0042324 A1* | 2/2016 | Johnson ........... G06Q 10/1095 705/7.19 |
| 2017/0310789 A1 | 10/2017 | Thomee |
| 2018/0129645 A1* | 5/2018 | Grant ............... H04L 51/222 |
| 2019/0182616 A1 | 6/2019 | Kamath et al. |

* cited by examiner

SYSTEMS, DEVICES AND METHODS FOR ELECTRONIC DETERMINATION AND COMMUNICATION OF LOCATION INFORMATION

BRIEF SUMMARY

Computerized messaging systems, such as Short Message Service (SMS) applications and Internet-based messaging or chat applications, are often used to coordinate meetings and appointments via electronic messages. Thus, users may often need to include address or other location information in such messages to let the recipient know where to meet. However, manually searching for, and then writing down, memorizing or electronically copying such address or other specific location information to then type or paste into one's message is inefficient and time consuming. In particular, this may often cause the user to switch between multiple different applications (web browsers, mapping applications, navigation systems, etc.), or may result in the user not finding the desired address or other location information at all. To solve this problem, described herein are systems, devices and methods for electronic determination and communication of location information that may automatically insert the relevant address or location information into the message as the user is typing the message, or shortly thereafter. In some embodiments, such insertion may be based on merely a place name typed by the user or a type or category of place typed by the user in the message. A menu of selectable addresses or place names may also be presented to the user for selection and automatic insertion into the message as the user is typing the message. In some embodiments, such relevant location information may be inserted automatically by the system on the recipient's device when the recipient receives the message. This improves the technology of electronic communications by improving the efficiency and speed of composing and sending electronic messages via improved graphical user interfaces and automated systems to detect and generate relevant text. The system may also automatically generate and send a selectable calendar item including the address, date and time and attendees based on information extracted from the message and previous relevant messages, as the message is being typed, or upon the sending or receiving of the message.

A computerized method for providing a user interface may be summarized as including: detecting, by at least one computer processor, at least one word entered in a text message by a user on a user interface of a computerized messaging system as the user is entering the text message; associating, by at least one computer processor, the at least one word with a location as the user is entering the text message with the at least one word; at least one computer processor automatically visually marking the at least one word itself within the text message, notifying the user that the at least one word is associated with the location as the user is entering the text message with the at least one word; at least one computer processor receiving input from the user resulting from the user selecting the at least one word in the text message while the at least one word is marked; and in response to the receiving the input from the user resulting from the user selecting the at least one word in the message while it is marked, at least one computer processor inserting in the text message location information regarding the location associated with the at least one word.

The associating the at least one word with a location as the user is entering the text message with the at least one word may include: extracting, by at least one computer processor, a copy of the at least one word from the text message as the user is entering the text message; searching, by at least one computer processor, location information associated with a location identified by the copy of the at least one word that was extracted from the text message; and storing, by at least one computer processor, an association between: the location information associated with the location identified by the copy of the at least one word that was extracted from the text message, the text message, and the copy of the at least one word that was extracted from the text message. The searching, by at least one computer processor, location information associated with a location identified by the copy of the at least one word that was extracted from the text message may include: accessing by at least one computer processor, previous location history data associated with a mobile device of the user indicative of previous physical locations the mobile device had been; determining, by at least one computer processor, previous locations visited by the user based on the previous location history data associated with a mobile device of the user; searching, by at least one computer processor, the previous locations visited by the user to determine whether any of the previous locations visited by the user match the location identified by the copy of the at least one word that was extracted from the text message; determining, by at least one computer processor, that at least one of the previous locations visited by the user matches the location identified by the copy of the at least one word that was extracted from the text message, based on the searching of the previous locations visited by the user to determine whether any of the previous locations visited by the user match the location identified by the copy of the at least one word that was extracted from the text message; and communicating, by at least one computer processor, location information of the at least one of the previous locations visited by the user that matched the location identified by the copy of the at least one word that was extracted from the text message to a text insertion engine of the computerized messaging system for insertion into the text message, while the user is entering text into the text message, the location information of the at least one of the previous locations visited by the user that matched the location identified by the copy of the at least one word that was extracted from the text message. The searching, by at least one computer processor, location information associated with a location identified by the copy of the at least one word that was extracted from the text message may include: accessing by at least one computer processor, an Internet search engine that provides location names and location data associated with the location names; searching, by at least one computer processor, the Internet using the Internet search engine to determine location data associated with the location identified by the copy of the at least one word that was extracted from the text message; receiving, by at least one computer processor, the location data associated with the location identified by the copy of the at least one word that was extracted from the text message, the receiving based on the searching the Internet using the Internet search engine to determine the location data associated with the location identified by the copy of the at least one word that was extracted from the text message; and communicating, by at least one computer processor, the location data associated with the location identified by the copy of the at least one word that was extracted from the text message to a text insertion engine of the computerized messaging system for insertion into the text message, while the user is entering text into the text message, the location data associated with the location identified by the copy of the at least one word that was extracted from the text message.

The automatically visually marking the at least one word itself within the text message, notifying the user that the at least one word is associated with the location as the user is entering the text message with the at least one word may include at least one of: highlighting the at least one word itself within the text message to notify the user that the at least one word is associated with the location as the user is entering the text message; bolding the at least one word itself within the text message to notify the user that the at least one word is associated with the location as the user is entering the text message; underlining the at least one word itself within the text message to notify the user that the at least one word is associated with the location as the user is entering the text message; italicizing the at least one word itself within the text message to notify the user that the at least one word is associated with the location as the user is entering the text message; outlining the at least one word itself within the text message to notify the user that the at least one word is associated with the location as the user is entering the text message; changing a color of the at least one word itself within the text message to notify the user that the at least one word is associated with the location as the user is entering the text message; and placing a symbol adjacent to the at least one word itself within the text message to notify the user that the at least one word is associated with the location as the user is entering the text message. The at least one computer processor receiving input from the user resulting from the user selecting the at least one word in the text message while the at least one word is marked may include: receiving input indicative of the user tapping on the at least one word in the text message while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and holding the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user double tapping the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and swiping on the at least one word in the text message over a predetermined threshold amount of time while the at least one word is marked to indicate the user would like the computerized messaging system to insert in the text message location information regarding the location associated with the at least one word. The automatically visually marking the at least one word itself within the text message, notifying the user that the at least one word is associated with the location as the user is entering the text message with the at least one word may include leaving the at least one word marked within the text message until either the user sends the text message or the input is received from the user resulting from the user selecting the at least one word in the text message while the at least one word is marked. The inserting in the text message location information regarding the location associated with the at least one word may include inserting in the text message location information regarding the location associated with the at least one word before the user sends the text message such that the user can see the location information regarding the location associated with the at least one word inserted in the text message before the user sends the text message. The location information inserted into the text message regarding the location associated with the at least one word entered in the text message may include a physical address of the location associated with the at least one word entered in the text message. The location information inserted into the text message regarding the location associated with the at least one word entered in the text message may include directions to the location associated with the at least one word entered in the text message. The location information inserted into the text message regarding the location associated with the at least one word entered in the text message may include a link to directions to the location associated with the at least one word entered in the text message. The location information inserted into the text message regarding the location associated with the at least one word entered in the text message may include GPS coordinate data of the location associated with the at least one word entered in the text message. The method may further include: in response to the receiving the input from the user resulting from the user selecting the at least one word in the message while it is marked, at least one computer processor inserting in the text message a link to a web site or social media account associated with the location associated with the at least one word. The method may further include at least one computer processor sending the text message including the location information inserted in the text message. The method may further include: at least one computer processor extracting information regarding to whom the text message is to be sent; at least one computer processor extracting from the text message date information regarding a potential appointment associated with the at least one word in the text message; and in response to the receiving the input from the user resulting from the user selecting the at least one word in the text message while it is marked, at least one computer processor generating a calendar item including: the date information, information identifying to whom the text message is to be sent and the location information based on: the extracted information regarding to whom the text message is to be sent, the extracted date information from the text message regarding the potential appointment associated with the at least one word in the text message and the at least one word in the text message. The method may further include: at least one computer processor sending the text message including the location information inserted in the text message; and at least one computer processor sending a calendar item to whom the text message is addressed, wherein the calendar item sent to whom the text is addressed includes the date information, information identifying the user and the location information based on: extracted information regarding to whom the text message is addressed, the extracted date information from the text message regarding the potential appointment associated with the at least one word in the text message and the at least one word in the text message. The calendar item may be sent after the text message is sent. The calendar item including the date information, information identifying to whom the text message is to be sent and the location information may be generated on a calendar of a mobile device of the user. The inserting in the text message location information regarding the location associated with the at least one word may include inserting the location information in the text message adjacent the at least one word in the text message. The inserting in the text message location information regarding the location associated with the at least one word may include replacing the at least one word in the text message with a full name of the location and the location information. The location may be one or more of: a restaurant, a store, an office, a manufacturing facility, a coffee shop, a construction site, a workplace, a residence, a sporting event venue, a music venue, a movie theater, a music venue, a bar, an amusement park, a public transportation station, an intersection, a park, a landmark, a public facility, a zoo, a temporary store, an event venue and an address of a place. The at least one word entered in the text message by the user may be indicative of a current location of a mobile device of the user and the location information inserted in the text message regarding the location associated with the at least one word may be location information identifying the current location of the user. The at least one word entered in the text message by the user may include the words: "current location" or "my location". The location information inserted in the text message regarding the location associated with the at least one word may be an address associated with the current location of the mobile device of the user.

A computerized method for providing a user interface may be summarized as including: detecting, by at least one computer processor, at least one word entered in a text message by a user on a user interface of a computerized messaging system as the user is entering the text message; associating, by at least one computer processor, the at least one word with a location as the user is entering the text message with the at least one word; and in response to the associating of the at least one word with a location as the user is entering the text message with the at least one word, at least one computer processor inserting in the text message location information regarding the location associated with the at least one word.

The method may further include at least one computer processor automatically visually marking the location information inserted into the text message, notifying the user that the location information regarding the location was inserted into the text message. The method may further include: at least one computer processor receiving input from the user resulting from the user selecting the location information regarding the location inserted into the text message while the location information inserted into the text message is marked; and in response to the receiving the input from the user resulting from the user selecting the location information inserted into the text message, at least one computer processor displaying a selectable under interface element to undo the insertion of the location information inserted into the text message. The inserting in the text message location information regarding the location associated with the at least one word may include inserting the location information in the text message adjacent the at least one word in the text message.

A computerized method for providing a user interface may be summarized as including: detecting, by at least one computer processor, at least one word entered in a text message by a user on a user interface of a computerized messaging system as the user is entering the text message; associating, by at least one computer processor, the at least one word with a location as the user is entering the text message with the at least one word; at least one computer processor automatically visually marking the at least one word itself within the text message, notifying the user that the at least one word is associated with the location as the user is entering the text message with the at least one word; at least one computer processor receiving input from the user resulting from the user selecting the at least one word in the text message while the at least one word is marked; and in response to the receiving the input from the user resulting from the user selecting the at least one word in the message while it is marked, at least one computer processor displaying a graphical user interface item including a menu of selectable options associated with the at least one word entered in the text message by the user, the menu of selectable options associated with the at least one word entered in the text message by the user including: an option to not insert in the text message location data associated with the at least one word entered in the text message by the user and one or more different possible options regarding insertion of location data associated with the at least one word entered in the text message by the user.

The one or more different possible options regarding insertion of location data associated with the at least one word entered in the text message by the user may include selectable options for location names that can be inserted into the text message that are associated with the at least one word entered in the text message by the user. The one or more different possible options regarding insertion of location data associated with the at least one word entered in the text message by the user may include selectable options for location addresses that can be inserted into the text message that are associated with the at least one word entered in the text message by the user.

A computerized method for providing a user interface may be summarized as including: detecting, by at least one computer processor, at least one word entered in a text message by a user on a user interface of a computerized messaging system as the user is entering the text message; associating, by at least one computer processor, the at least one word with a location as the user is entering the text message with the at least one word; at least one computer processor extracting information regarding to whom the text message is to be sent; at least one computer processor extracting from one or more text messages of the user date information regarding a potential appointment associated with the at least one word in the text message; and at least one computer processor generating a calendar item including: the date information, information identifying to whom the text message is to be sent and the location information based on: the extracted information regarding to whom the text message is to be sent, the extracted date information from one or more text messages of the user regarding the potential appointment associated with the at least one word in the text message and the at least one word in the text message.

The method may further include: at least one computer processor automatically visually marking the at least one word itself within the text message, notifying the user that the at least one word is associated with the potential appointment; at least one computer processor receiving input from the user resulting from the user selecting the at least one word in the text message while the at least one word is marked; and in response to the receiving the input from the user resulting from the user selecting the at least one word in the message while it is marked, at least one computer processor performing the generating of the calendar item including: the date information, the information identifying to whom the text message is to be sent and the location information based on: the extracted information regarding to whom the text message is to be sent, the extracted date information from the from one or more text messages of the user regarding the potential appointment associated with the at least one word in the text message and the at least one word in the text message. The method may further include: at least one computer processor sending the text message; and at least one computer processor sending the calendar item. The calendar item including the date information, information identifying to whom the text message is to be sent and the location information may be generated on a calendar of a mobile device of the user.

A system for providing a user interface may be summarized as including: at least one computer processor; and at least one memory coupled to the at least one computer processor, wherein the at least one memory has computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; automatically visually mark the at least one word itself within the text message, notifying the user that the at least one word is associated with the location as the user is entering the text message with the at least one word; receive input from the user resulting from the user selecting the at least one word in the text message while the at least one word is marked; and in response to receiving the input from the user resulting from the user selecting the at least one word in the message while it is marked, insert in the text message location information regarding the location associated with the at least one word.

The associating the at least one word with a location as the user is entering the text message with the at least one word may include: extracting a copy of the at least one word from the text message as the user is entering the text message; searching location information associated with a location identified by the copy of the at least one word that was extracted from the text message; and storing an association between: the location information associated with the location identified by the copy of the at least one word that was extracted from the text message, the text message, and the copy of the at least one word that was extracted from the text message. The searching, by at least one computer processor, location information associated with a location identified by the copy of the at least one word that was extracted from the text message may include: accessing, by at least one computer processor, previous location history data associated with a mobile device of the user indicative of previous physical locations the mobile device had been; determining, by at least one computer processor, previous locations visited by the user based on the previous location history data associated with a mobile device of the user; searching, by at least one computer processor, the previous locations visited by the user to determine whether any of the previous locations visited by the user match the location identified by the copy of the at least one word that was extracted from the text message; determining, by at least one computer processor, that at least one of the previous locations visited by the user matches the location identified by the copy of the at least one word that was extracted from the text message, based on the searching of the previous locations visited by the user to determine whether any of the previous locations visited by the user match the location identified by the copy of the at least one word that was extracted from the text message; and communicating, by at least one computer processor, location information of the at least one of the previous locations visited by the user that matched the location identified by the copy of the at least one word that was extracted from the text message to a text insertion engine of the computerized messaging system for insertion into the text message, while the user is entering text into the text message, the location information of the at least one of the previous locations visited by the user that matched the location identified by the copy of the at least one word that was extracted from the text message. The searching, by at least one computer processor, location information associated with a location identified by the copy of the at least one word that was extracted from the text message may include: accessing by at least one computer processor, an Internet search engine that provides location names and location data associated with the location names; searching, by at least one computer processor, the Internet using the Internet search engine to determine location data associated with the location identified by the copy of the at least one word that was extracted from the text message; receiving, by at least one computer processor, the location data associated with the location identified by the copy of the at least one word that was extracted from the text message, the receiving based on the searching the Internet using the Internet search engine to determine the location data associated with the location identified by the copy of the at least one word that was extracted from the text message; and communicating, by at least one computer processor, the location data associated with the location identified by the copy of the at least one word that was extracted from the text message to a text insertion engine of the computerized messaging system for insertion into the text message, while the user is entering text into the text message, the location data associated with the location identified by the copy of the at least one word that was extracted from the text message. The automatically visually marking the at least one word itself within the text message, notifying the user that the at least one word is associated with the location as the user is entering the text message with the at least one word may include at least one of: highlighting the at least one word itself within the text message to notify the user that the at least one word is associated with the location as the user is entering the text message; bolding the at least one word itself within the text message to notify the user that the at least one word is associated with the location as the user is entering the text message; underlining the at least one word itself within the text message to notify the user that the at least one word is associated with the location as the user is entering the text message; italicizing the at least one word itself within the text message to notify the user that the at least one word is associated with the location as the user is entering the text message; outlining the at least one word itself within the text message to notify the user that the at least one word is associated with the location as the user is entering the text message; changing a color of the at least one word itself within the text message to notify the user that the at least one word is associated with the location as the user is entering the text message; and placing a symbol adjacent to the at least one word itself within the text message to notify the user that the at least one word is associated with the location as the user is entering the text message. The at least one computer processor receiving input from the user resulting from the user selecting the at least one word in the text message while the at least one word is marked may include: receiving input indicative of the user tapping on the at least one word in the text message while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and holding the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user double tapping the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and swiping on the at least one word in the text message over a predetermined threshold amount of time while the at least one word is marked to indicate the user would like the computerized messaging system to insert in the text message location information regarding the location associated with the at least one word. The automatically visually marking the at least one word itself within the text message, notifying the user that the at least one word is associated with the location as the user is entering the text message with the at least one word may include leaving the at least one word marked within the text message until either the user sends the text message or the input is received from the user resulting from the user selecting the at least one word in the text message while the at least one word is marked. The inserting in the text message location information regarding the location associated with the at least one word may include inserting in the text message location information regarding the location associated with the at least one word before the user sends the text message such that the user can see the location information regarding the location associated with the at least one word inserted in the text message before the user sends the text message. The location information inserted into the text message regarding the location associated with the at least one word entered in the text message may include a physical address of the location associated with the at least one word entered in the text message. The location information inserted into the text message regarding the location associated with the at least one word entered in the text message may include directions to the location associated with the at least one word entered in the text message. The location information inserted into the text message regarding the location associated with the at least one word entered in the text message may include a link to directions to the location associated with the at least one word entered in the text message. The location information inserted into the text message regarding the location associated with the at least one word entered in the text message may include GPS coordinate data of the location associated with the at least one word entered in the text message. The computer-executable instructions, when executed, may further cause the at least one processor to: in response to the receiving the input from the user resulting from the user selecting the at least one word in the message while it is marked, insert in the text message a link to a web site or social media account associated with the location associated with the at least one word. The computer-executable instructions, when executed, may further cause the at least one processor to send the text message including the location information inserted in the text message. The computer-executable instructions, when executed, may further cause the at least one processor to: extract information regarding to whom the text message is to be sent; extract from the text message date information regarding a potential appointment associated with the at least one word in the text message; and in response to the receiving the input from the user resulting from the user selecting the at least one word in the text message while it is marked, generate a calendar item including: the date information, information identifying to whom the text message is to be sent and the location information based on: the extracted information regarding to whom the text message is to be sent, the extracted date information from the text message regarding the potential appointment associated with the at least one word in the text message and the at least one word in the text message. The computer-executable instructions, when executed, may further cause the at least one processor to: send the text message including the location information inserted in the text message; and send a calendar item to whom the text message is addressed, wherein the calendar item sent to whom the text is addressed includes the date information, information identifying the user and the location information based on: extracted information regarding to whom the text message is addressed, the extracted date information from the text message regarding the potential appointment associated with the at least one word in the text message and the at least one word in the text message. The calendar item may be sent after the text message is sent. The calendar item including the date information, information identifying to whom the text message is to be sent and the location information may be generated on a calendar of a mobile device of the user. The inserting in the text message location information regarding the location associated with the at least one word may include inserting the location information in the text message adjacent the at least one word in the text message. The inserting in the text message location information regarding the location associated with the at least one word may include replacing the at least one word in the text message with a full name of the location and the location information. The location may be one or more of: a restaurant, a store, an office, a manufacturing facility, a coffee shop, a construction site, a workplace, a residence, a sporting event venue, a music venue, a movie theater, a music venue, a bar an amusement park, a public transportation station, an intersection, a park, a landmark, a public facility, a zoo, a temporary store, an event venue an address of a place. The at least one word entered in the text message by the user may be indicative of a current location of a mobile device of the user and the location information inserted in the text message regarding the location associated with the at least one word may be location information identifying the current location of the user. The at least one word entered in the text message by the user may include the words: "current location" or "my location". The location information inserted in the text message regarding the location associated with the at least one word may be an address associated with the current location of the mobile device of the user. A system for providing a user interface may be summarized as including: at least one computer processor; and at least one memory coupled to the at least one computer processor, wherein the at least one memory has computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; and in response to the association of the at least one word with a location as the user is entering the text message with the at least one word, insert in the text message location information regarding the location associated with the at least one word.

The computer-executable instructions, when executed, may further cause the at least one processor to automatically visually mark the location information inserted into the text message, notifying the user that the location information regarding the location was inserted into the text message. The computer-executable instructions, when executed, may further cause the at least one processor to: receive input from the user resulting from the user selecting the location information regarding the location inserted into the text message while the location information inserted into the text message is marked; and in response to the receiving the input from the user resulting from the user selecting the location information inserted into the text message, display a selectable under interface element to undo the insertion of the location information inserted into the text message. The inserting in the text message location information regarding the location associated with the at least one word may include inserting the location information in the text message adjacent the at least one word in the text message.

A system for providing a user interface may be summarized as including: at least one computer processor; and at least one memory coupled to the at least one computer processor, wherein the at least one memory has computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; automatically visually mark the at least one word itself within the text message, notifying the user that the at least one word is associated with the location as the user is entering the text message with the at least one word; receive input from the user resulting from the user selecting the at least one word in the text message while the at least one word is marked; and in response to the receiving the input from the user resulting from the user selecting the at least one word in the message while it is marked, display a graphical user interface item including menu of selectable options associated with the at least one word entered in the text message by the user, the menu of selectable options associated with the at least one word entered in the text message by the user including: an option to not insert in the text message location data associated with the at least one word entered in the text message by the user and one or more different possible options regarding insertion of location data associated with the at least one word entered in the text message by the user.

The one or more different possible options regarding insertion of location data associated with the at least one word entered in the text message by the user may include selectable options for location names that can be inserted into the text message that are associated with the at least one word entered in the text message by the user. The one or more different possible options regarding insertion of location data associated with the at least one word entered in the text message by the user may include selectable options for location addresses that can be inserted into the text message that are associated with the at least one word entered in the text message by the user.

A system for providing a user interface may be summarized as including: at least one computer processor; and at least one memory coupled to the at least one computer processor, wherein the at least one memory has computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; extract information regarding to whom the text message is to be sent; extract from one or more text messages of the user date information regarding a potential appointment associated with the at least one word in the text message; and generate a calendar item including: the date information, information identifying to whom the text message is to be sent and the location information based on: the extracted information regarding to whom the text message is to be sent, the extracted date information from the one or more text messages of the user regarding the potential appointment associated with the at least one word in the text message and the at least one word in the text message.

The computer-executable instructions, when executed, may further cause the at least one processor to: automatically visually mark the at least one word itself within the text message, notifying the user that the at least one word is associated with the potential appointment; receive input from the user resulting from the user selecting the at least one word in the text message while the at least one word is marked; and in response to the receiving the input from the user resulting from the user selecting the at least one word in the message while it is marked, perform the generation of the calendar item including: the date information, the information identifying to whom the text message is to be sent and the location information based on: the extracted information regarding to whom the text message is to be sent, the extracted date information from the from one or more text messages of the user regarding the potential appointment associated with the at least one word in the text message and the at least one word in the text message. The computer-executable instructions, when executed, may further cause the at least one processor to: send the text message; and send the calendar item. The calendar item including the date information, information identifying to whom the text message is to be sent and the location information may be generated on a calendar of a mobile device of the user. The computer-executable instructions, when executed, may further cause the at least one processor to: display a graphical user interface item including a menu of selectable options associated with the at least one word entered in the text message by the user, the menu of selectable options associated with the at least one word entered in the text message by the user including: one or more different possible options regarding insertion of location data associated with the at least one word entered in the text message by the user.

A non-transitory computer-readable storage medium may be summarized as including computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; automatically visually mark the at least one word itself within the text message, notifying the user that the at least one word is associated with the location as the user is entering the text message with the at least one word; receive input from the user resulting from the user selecting the at least one word in the text message while the at least one word is marked; and in response to receiving the input from the user resulting from the user selecting the at least one word in the message while it is marked, insert in the text message location information regarding the location associated with the at least one word.

The associating the at least one word with a location as the user is entering the text message with the at least one word may include: extracting a copy of the at least one word from the text message as the user is entering the text message; searching location information associated with a location identified by the copy of the at least one word that was extracted from the text message; and storing an association between: the location information associated with the location identified by the copy of the at least one word that was extracted from the text message, the text message, and the copy of the at least one word that was extracted from the text message. The searching, by at least one computer processor, location information associated with a location identified by the copy of the at least one word that was extracted from the text message may include: accessing, by at least one computer processor, previous location history data associated with a mobile device of the user indicative of previous physical locations the mobile device had been; determining, by at least one computer processor, previous locations visited by the user based on the previous location history data associated with a mobile device of the user; searching, by at least one computer processor, the previous locations visited by the user to determine whether any of the previous locations visited by the user match the location identified by the copy of the at least one word that was extracted from the text message; determining, by at least one computer processor, that at least one of the previous locations visited by the user matches the location identified by the copy of the at least one word that was extracted from the text message, based on the searching of the previous locations visited by the user to determine whether any of the previous locations visited by the user match the location identified by the copy of the at least one word that was extracted from the text message; and communicating, by at least one computer processor, location information of the at least one of the previous locations visited by the user that matched the location identified by the copy of the at least one word that was extracted from the text message to a text insertion engine of the computerized messaging system for insertion into the text message, while the user is entering text into the text message, the location information of the at least one of the previous locations visited by the user that matched the location identified by the copy of the at least one word that was extracted from the text message. The searching, by at least one computer processor, location information associated with a location identified by the copy of the at least one word that was extracted from the text message may include: accessing by at least one computer processor, an Internet search engine that provides location names and location data associated with the location names; searching, by at least one computer processor, the Internet using the Internet search engine to determine location data associated with the location identified by the copy of the at least one word that was extracted from the text message; receiving, by at least one computer processor, the location data associated with the location identified by the copy of the at least one word that was extracted from the text message, the receiving based on the searching the Internet using the Internet search engine to determine the location data associated with the location identified by the copy of the at least one word that was extracted from the text message; and communicating, by at least one computer processor, the location data associated with the location identified by the copy of the at least one word that was extracted from the text message to a text insertion engine of the computerized messaging system for insertion into the text message, while the user is entering text into the text message, the location data associated with the location identified by the copy of the at least one word that was extracted from the text message. The automatically visually marking the at least one word itself within the text message, notifying the user that the at least one word is associated with the location as the user is entering the text message with the at least one word may include at least one of: highlighting the at least one word itself within the text message to notify the user that the at least one word is associated with the location as the user is entering the text message; bolding the at least one word itself within the text message to notify the user that the at least one word is associated with the location as the user is entering the text message; underlining the at least one word itself within the text message to notify the user that the at least one word is associated with the location as the user is entering the text message; italicizing the at least one word itself within the text message to notify the user that the at least one word is associated with the location as the user is entering the text message; outlining the at least one word itself within the text message to notify the user that the at least one word is associated with the location as the user is entering the text message; changing a color of the at least one word itself within the text message to notify the user that the at least one word is associated with the location as the user is entering the text message; and placing a symbol adjacent to the at least one word itself within the text message to notify the user that the at least one word is associated with the location as the user is entering the text message. The at least one computer processor receiving input from the user resulting from the user selecting the at least one word in the text message while the at least one word is marked may include: receiving input indicative of the user tapping on the at least one word in the text message while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and holding the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user double tapping the at least one word in the text message over a predetermined threshold amount of time while the at least one word is marked to indicate the user would like the computerized messaging system to insert in the text message location information regarding the location associated with the at least one word. The at least one computer processor receiving input from the user resulting from the user selecting the at least one word in the text message while the at least one word is marked may include: receiving input indicative of the user pressing and swiping on the at least one word in the text message over a predetermined threshold amount of time while the at least one word is marked to indicate the user would like the computerized messaging system to insert in the text message location information regarding the location associated with the at least one word. The automatically visually marking the at least one word itself within the text message, notifying the user that the at least one word is associated with the location as the user is entering the text message with the at least one word may include leaving the at least one word marked within the text message until either the user sends the text message or the input is received from the user resulting from the user selecting the at least one word in the text message while the at least one word is marked. The inserting in the text message location information regarding the location associated with the at least one word may include inserting in the text message location information regarding the location associated with the at least one word before the user sends the text message such that the user can see the location information regarding the location associated with the at least one word inserted in the text message before the user sends the text message. The location information inserted into the text message regarding the location associated with the at least one word entered in the text message may include a physical address of the location associated with the at least one word entered in the text message. The location information inserted into the text message regarding the location associated with the at least one word entered in the text message may include directions to the location associated with the at least one word entered in the text message. The location information inserted into the text message regarding the location associated with the at least one word entered in the text message may include a link to directions to the location associated with the at least one word entered in the text message. The location information inserted into the text message regarding the location associated with the at least one word entered in the text message may include GPS coordinate data of the location associated with the at least one word entered in the text message. The computer-executable instructions, when executed, may further cause the at least one processor to: in response to the receiving the input from the user resulting from the user selecting the at least one word in the message while it is marked, insert in the text message a link to a web site or social media account associated with the location associated with the at least one word. The computer-executable instructions, when executed, may further cause the at least one processor to send the text message including the location information inserted in the text message. The computer-executable instructions, when executed, may further cause the at least one processor to: extract information regarding to whom the text message is to be sent; extract from the text message date information regarding a potential appointment associated with the at least one word in the text message; and in response to the receiving the input from the user resulting from the user selecting the at least one word in the text message while it is marked, generate a calendar item including: the date information, information identifying to whom the text message is to be sent and the location information based on: the extracted information regarding to whom the text message is to be sent, the extracted date information from the text message regarding the potential appointment associated with the at least one word in the text message and the at least one word in the text message. The computer-executable instructions, when executed, may further cause the at least one processor to: send the text message including the location information inserted in the text message; and send a calendar item to whom the text message is addressed, wherein the calendar item sent to whom the text is addressed includes the date information, information identifying the user and the location information based on: extracted information regarding to whom the text message is addressed, the extracted date information from the text message regarding the potential appointment associated with the at least one word in the text message and the at least one word in the text message. The calendar item may be sent after the text message is sent. The calendar item including the date information, information identifying to whom the text message is to be sent and the location information may be generated on a calendar of a mobile device of the user. The inserting in the text message location information regarding the location associated with the at least one word may include inserting the location information in the text message adjacent the at least one word in the text message. The inserting in the text message location information regarding the location associated with the at least one word may include replacing the at least one word in the text message with a full name of the location and the location information. The location may be one or more of: a restaurant, a store, an office, a manufacturing facility, a coffee shop, a construction site, a workplace, a residence, a sporting event venue, a music venue, a movie theater, a music venue, a bar an amusement park, a public transportation station, an intersection, a park, a landmark, a public facility, a zoo, a temporary store, an event venue an address of a place. The at least one word entered in the text message by the user may be indicative of a current location of a mobile device of the user and the location information inserted in the text message regarding the location associated with the at least one word may be location information identifying the current location of the user. The at least one word entered in the text message by the user may include the words: "current location" or "my location". The location information inserted in the text message regarding the location associated with the at least one word may be an address associated with the current location of the mobile device of the user.

A non-transitory computer-readable storage medium may be summarized as including computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; and in response to the association of the at least one word with a location as the user is entering the text message with the at least one word, insert in the text message location information regarding the location associated with the at least one word.

The computer-executable instructions, when executed, may further cause the at least one processor to automatically visually mark the location information inserted into the text message, notifying the user that the location information regarding the location was inserted into the text message. The computer-executable instructions, when executed, may further cause the at least one processor to: receive input from the user resulting from the user selecting the location information regarding the location inserted into the text message while the location information inserted into the text message is marked; and in response to the receiving the input from the user resulting from the user selecting the location information inserted into the text message, display a selectable under interface element to undo the insertion of the location information inserted into the text message. The inserting in the text message location information regarding the location associated with the at least one word may include inserting the location information in the text message adjacent the at least one word in the text message.

A non-transitory computer-readable storage medium may be summarized as including computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; automatically visually mark the at least one word itself within the text message, notifying the user that the at least one word is associated with the location as the user is entering the text message with the at least one word; receive input from the user resulting from the user selecting the at least one word in the text message while the at least one word is marked; and in response to the receiving the input from the user resulting from the user selecting the at least one word in the message while it is marked, display a graphical user interface item including menu of selectable options associated with the at least one word entered in the text message by the user, the menu of selectable options associated with the at least one word entered in the text message by the user including: an option to not insert in the text message location data associated with the at least one word entered in the text message by the user and one or more different possible options regarding insertion of location data associated with the at least one word entered in the text message by the user.

The one or more different possible options regarding insertion of location data associated with the at least one word entered in the text message by the user may include selectable options for location names that can be inserted into the text message that are associated with the at least one word entered in the text message by the user. The one or more different possible options regarding insertion of location data associated with the at least one word entered in the text message by the user may include selectable options for location addresses that can be inserted into the text message that are associated with the at least one word entered in the text message by the user. The computer executable instructions stored, when executed by the at least one processor, may further cause the at least one processor to: receive input from the user resulting from the user selecting at least one of the selectable options from the menu of selectable options associated with the at least one word entered in the text message; in response to receiving input from the user resulting from the user selecting at least one of the selectable options, inserting in the text message location data associated with the selected user selectable option and the at least one word entered in the text message by the user.

A non-transitory computer-readable storage medium may be summarized as including computer executable instructions stored thereon that, when executed by the at least one processor, cause the at least one processor to: detect at least one word entered in a text message by a user on a user interface of a computerized messaging system as the user is entering the text message; associate the at least one word with a location as the user is entering the text message with the at least one word; extract information regarding to whom the text message is to be sent; extract from one or more text messages of the user date information regarding a potential appointment associated with the at least one word in the text message; and generate a calendar item including: the date information, information identifying to whom the text message is to be sent and the location information based on: the extracted information regarding to whom the text message is to be sent, the extracted date information from the from one or more text messages of the user regarding the potential appointment associated with the at least one word in the text message and the at least one word in the text message.

The computer-executable instructions, when executed, may further cause the at least one processor to: automatically visually mark the at least one word itself within the text message, notifying the user that the at least one word is associated with the potential appointment; receive input from the user resulting from the user selecting the at least one word in the text message while the at least one word is marked; and in response to the receiving the input from the user resulting from the user selecting the at least one word in the message while it is marked, perform the generation of the calendar item including: the date information, the information identifying to whom the text message is to be sent and the location information based on: the extracted information regarding to whom the text message is to be sent, the extracted date information from the from one or more text messages of the user regarding the potential appointment associated with the at least one word in the text message and the at least one word in the text message. The computer-executable instructions, when executed, may further cause the at least one processor to: send the text message; and send the calendar item. The calendar item including the date information, information identifying to whom the text message is to be sent and the location information may be generated on a calendar of a mobile device of the user. The user entering the text message may include one or more of: the user typing the text message and the user using a speech-to-text system to enter the text message.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
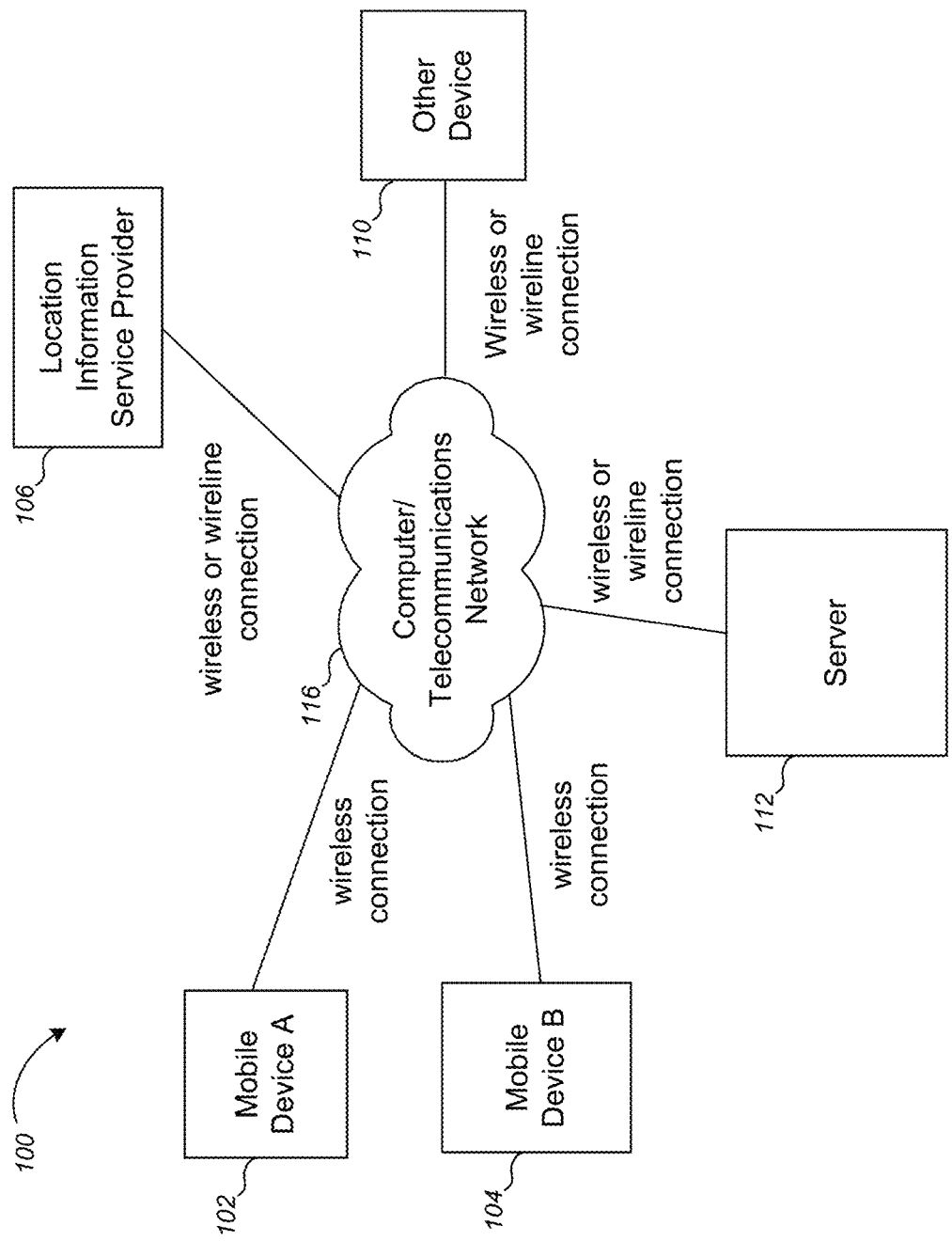
FIG. 1 is a system diagram of a networked environment, in which systems, devices and methods for electronic determination and communication of location information may be a part, or in which they may be implemented, according to one example illustrated embodiment.

FIG. 1 is a system diagram of a networked environment 100, in which systems, devices and methods for electronic determination and communication of location information may be a part, or in which they may be implemented, according to one example illustrated embodiment.

The networked environment 100 may include a plurality of mobile devices (e.g., mobile device A 102 and mobile device B 104), a location information service provider 106, one or more other devices (e.g., other device 110) and a server 112 (e.g., a backend server). The mobile device A 102 and mobile device B 104, location information service provider 106, other device 110 and server 112 are all communicatively coupled via a computer/telecommunications network 116. Additional mobile devices, other devices and service providers may also be present and included in the network environment, but are not illustrated for clarity of presentation.

The computer/telecommunications network 116 may be any telecommunications network, computer network or combination of telecommunications and computer networks that enables communication between the various devices connected to the network 116 shown in FIG. 1. For example, mobile telecommunications provided by network 116 may include various digital mobile telecommunications including those according to the International Mobile Telecommunications Advanced (IMT-Advanced) specification specified by the International Telecommunications Union-Radio communications sector (ITU-R), such as those of Mobile WiMAX and Long Term Evolution (LTE) standard, better known as the 4th Generation (4G), family of standards for mobile telecommunications fulfilling specifications by the International Telecommunication Union.

The mobile devices 102 and 104 (e.g., mobile phones, tablet devices, electronic book readers, notebook computers, wearable devices, watches, computerized jewelry, computerized clothing, etc.) the other device 110, server 112 and location information service provider 106 may be additionally or optionally linked by one or more other communication links or networks that comprise network 116. For example, a communications network of network 116 may include a local area network that uses wireless fidelity (Wi-Fi) high-frequency radio signals to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the various devices and systems shown in FIG. 1. Thus, the mobile devices 102 and 104 may have various applicable wireless transmitters and receivers and, in the case of using a Wi-Fi wireless link, may also have the corresponding executable Wi-Fi compatible network communications software that initiates, controls, maintains or manages the wireless link between the mobile devices 102 and 104 and the various other devices and systems within or connected to network 116 over the Wi-Fi signal of the network 116.

The network 116 may comprise connections to computing systems such as server 112 and location information service provider 106 which provide services to the mobile devices 102 and 104 and other device 110 (i.e., a server-based network), and may itself represent multiple interconnected networks. For instance wired and wireless enterprise-wide computer networks, intranets, extranets, and/or the Internet may be included in or comprise a part of network 116. Also, in some embodiments, one or more of the services provided by location information service provider 106 and server 112 may be provided by a single system or server. Embodiments may include various types of communication networks including other telecommunications networks, cellular networks, paging networks, and other mobile networks. There may be any variety of computers, switching devices, routers, bridges, firewalls, edge devices, multiplexers, phone lines, cables, telecommunications equipment and other devices within network 116 and/or in the communications paths between the mobile devices 104 and 106, the other device 110, location information service provider 106 and server 112. Some or all of such equipment of network 116 may be owned, leased or controlled by service providers such as location information service provider 106 or an entity controlling server 112.

In accordance with an aspect of the disclosure, the mobile devices 102 and 104 and other device 110 may contain discrete functional program modules that might make use of an application programming interface (API), or other object, software, firmware and/or hardware, to request services of one or more of the other entities within or connected to the network 116, such as location information service provider 106 and server 112. For example, communication can be provided over a communications medium, e.g., client and server systems running on any one of the mobile device A 102, mobile device B 104, location information service provider 106 and server 112. These client and server systems may be coupled to one another via transmission control protocol/internet protocol (TCP/IP) connection(s) for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer or device, e.g., a server. In the example of FIG. 1, the mobile devices 102 and 104 and other device 110 (e.g., other mobile or stationary device including, but not limited to a notebook computer, desktop computer, entertainment device, media device, television, game console, music player, etc.) may be clients requesting the services of the server 112 and/or location information service provider 106. However, any entity in FIG. 1, including mobile devices 102 and 104, can be considered a client, a server, or both, depending on the circumstances.

One or more cellular towers and stations may be part of a cellular network that is part of the computer/telecommunications network 116, and may be communicatively linked by one or more communications networks or communication mediums within the computer/telecommunications network 116 (e.g., using a cellular or other wired or wireless signal) in order to facilitate sending and receiving information in the form of synchronous or asynchronous voice communications and video, image and/or textual data to and from the mobile devices 102 and 104. This communication may be over a wireless signal on the cellular network of network 116 using applicable combinations and layers of telecommunications and networking protocols and standards such as 4G, HTTP and TCP/IP, etc.

Although the physical environment of the network 116 may have connected devices such as computers, the physical environment may alternatively have or be described as comprising various digital devices such as personal digital assistants (PDAs), televisions, media players, MP3 players, etc., software objects such as interfaces, Component Object Model (COM) objects and the like. There are a variety of systems, components, and network configurations that may also support distributed computing environments within the network 116. For example, computing systems may be connected together within the network 116 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the network 116.

The mobile devices 104 and 106 can take the form of any of a large variety of mobile communications and/or processing devices having a handheld form factor. Examples of such may include cellular phones, personal digital assistants or PDAs (e.g., iPhone® devices, Android® devices, Blackberry® devices, etc.), notebook computers, netbook computers, tablet devices or electronic book reading devices (e.g., IPAD® device, Kindle® devices, etc.).

The location information service provider 106 may be any service provider system that provides location information accessible by a user. For example, this may include a database of addresses, coordinates, global positioning system (GPS) data, previous location history data associated with a mobile device (e.g., with mobile device A 102 or mobile device B 104) or other location information, such as location information associated with a location identifier.

For example, the location identifier may be a keyword, a name of a restaurant, a store, an office, a manufacturing facility, a coffee shop, a construction site, a workplace, a residence, a sporting event venue, a music venue, a movie theater, a music venue, a bar, an amusement park, a public transportation station, an intersection, a park, a landmark, a public facility, a zoo, a temporary store, or an event venue. Such information may be searchable by the location identifier, location name, keyword, coordinates, GPS data or other location information. In various embodiments, the location information is associated with a location identified by at least one word that was extracted from the text message. In some embodiments, the location information service provider 106 may represent the Internet or one or more servers or service providers located on the Internet, an Internet search engine that provides location names and location data associated with location identifiers, such as location names. In various embodiments, such location identifiers may be extracted from text messages or other electronic message being written, sent or stored on mobile device A 102 and/or mobile device B 104.

Although not required, the embodiments will be described in the general context of computer-executable instructions, such as program application modules, objects, or macros stored on computer- or processor-readable storage media and executed by a computer or processor. Those skilled in the relevant art will appreciate that the illustrated embodiments, as well as other embodiments, can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 116. In a distributed computing environment, program modules may be located in both local and remote memory storage devices.

Figure 2:
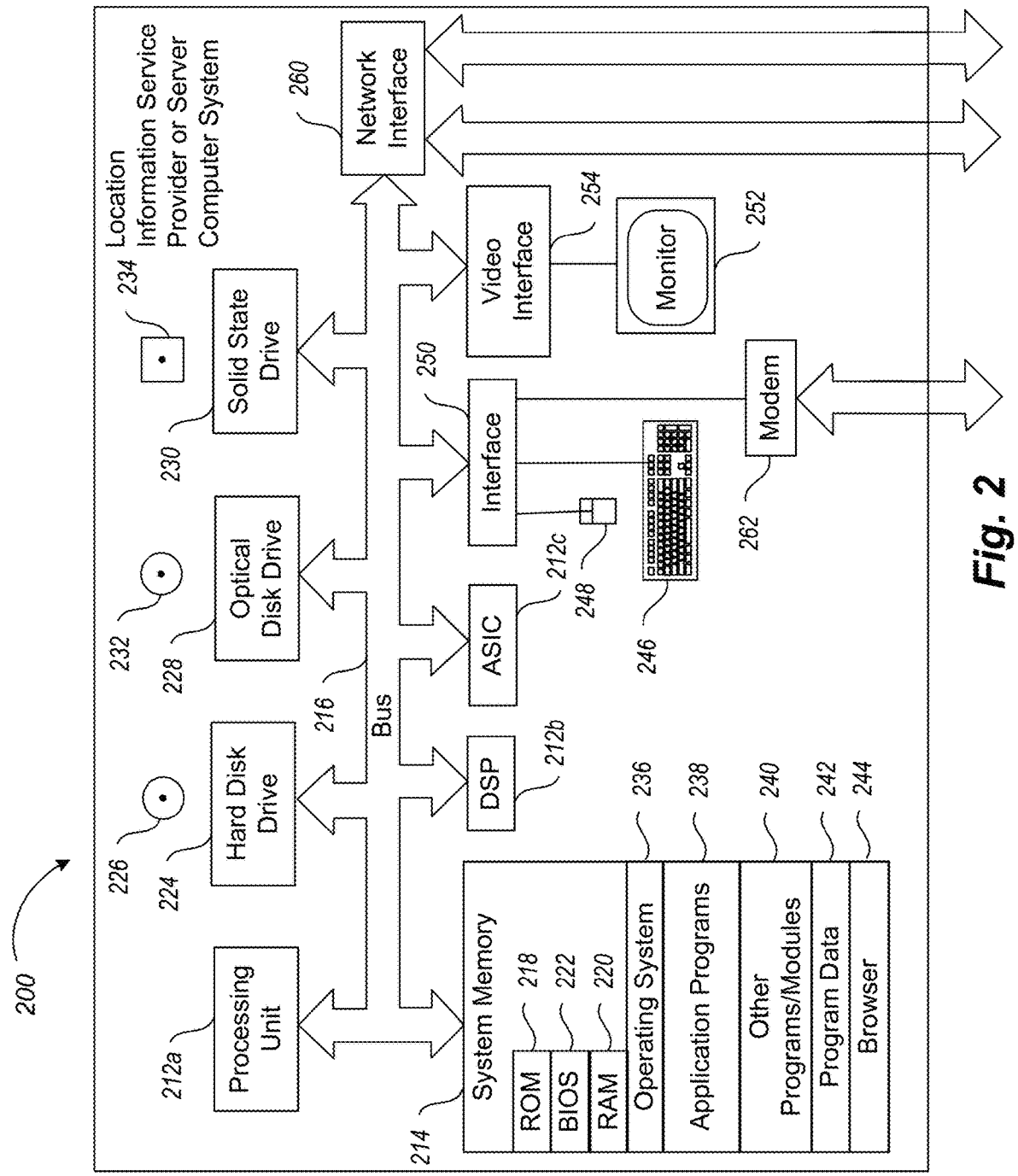
FIG. 2 is a schematic diagram of an example computer system of the location information service provider or server of FIG. 1, suitable for implementing one or more aspects of systems, devices and methods for electronic determination and communication of location information, according to one example illustrated embodiment.

FIG. 2 is a schematic diagram of an example computer system of the location information service provider 106 or server 112 of FIG. 1, suitable for implementing one or more aspects of systems, devices and methods for electronic determination and communication of location information, according to one example illustrated embodiment.

The computer system 200 is suitable for implementing one or more aspects of systems, devices and methods for electronic determination and communication of location information, according to one example illustrated embodiment. The computer system 200 will at times be referred to in the singular herein, but this is not intended to limit the embodiments to a single device, since in typical embodiments, there may be more than one computer system or devices involved.

The computer system 200 may include one or more processing units 212a, 212b and 212c (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs) 212c, field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may also include a plurality of interfaces such as network interface 260, interface 250 supporting modem 262 or any other wireless/wired interfaces.

The computer system 200 may include a hard disk drive 224 for reading from and writing to a hard disk 226, an optical disk drive 228 for reading from and writing to removable optical disks 232, and/or a solid state drive 230 for reading from and writing to solid state memory 234. The optical disk 232 can be a DVD-ROM, while the solid state memory 234 can be a flash drive or other removable solid state memory device. The hard disk drive 224, optical disk drive 228 and solid state drive 230 may communicate with the processing unit 212 via the system bus 216. The hard disk drive 224, optical disk drive 228 and solid state drive 230 may include interfaces or controllers (not shown) coupled between such drives and the system bus 216, as is known by those skilled in the relevant art. The drives 224, 228 and 230, and their associated computer-readable storage media 226, 232, 234, may provide nonvolatile and non-transitory storage of computer-readable instructions, data structures, program modules and other data for the computer system 200. Although the depicted computer system 200 is illustrated employing a hard disk drive 224, optical disk drive 228 and solid state drive 230, those skilled in the relevant art will appreciate that other types of computer-readable storage media that can store data accessible by a computer may be employed, including Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 212a.

Program modules can be stored in the system memory 214, such as an operating system 236, one or more application programs 238, other programs or modules 240 and program data 242. Application programs 238 may include instructions that cause the processor(s) 212 to provide systems, devices and methods for electronic determination and communication of location information via communications between various devices such as, for example, mobile device A 102, mobile device B 104 and other device 110 of FIG. 1. Other program modules 240 may include instructions for handling security such as password or other access protection and communications encryption. The system memory 214 may also include communications programs, for example, a web client or browser 244 for permitting the computer system 200 to access and exchange data with sources such as web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of web clients or browsers are commercially available such as those from Mozilla, Google, and Microsoft of Redmond, Washington.

While shown in FIG. 2 as being stored in the system memory 214, the operating system 236, application programs 238, other programs/modules 240, program data 242 and browser 244 can be stored on the hard disk 226 of the hard disk drive 224, the optical disk 232 of the optical disk drive 228 and/or the solid state memory 234 of the solid state drive 230.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or more mobile devices, other devices and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 3:
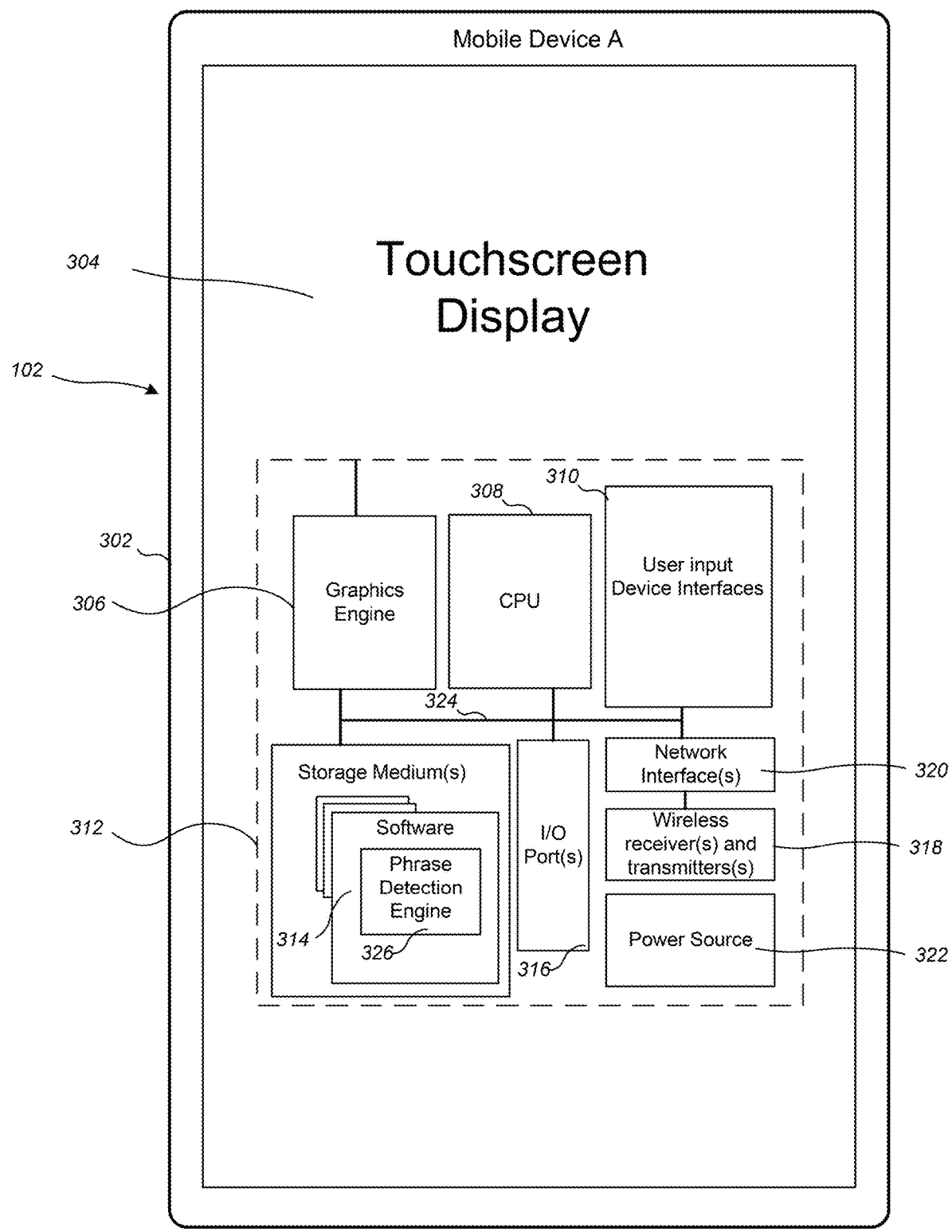
FIG. 3 is a schematic view of one of the mobile devices of FIG. 1, shown in more detail according to one example illustrated embodiment, the mobile device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), and a power source.

FIG. 3 shows the mobile device A 102 of FIG. 1 in more detail according to one example embodiment. The mobile device A 102 may have a housing 302, a display 304, a graphics engine 306, a central processing unit (CPU) 308, one or more user input devices 310, one or more storage mediums 312 having various software modules 314 stored thereon comprising instructions that are executable by the CPU 308, input/output (I/O) port(s) 316, one or more wireless receivers and transmitters 318, one or more network interfaces 320, and a power source 322.

As previously noted, the mobile device A 102 may be any of a large variety of communications devices such as a tablet device, cellular telephone, a portable media player (PMP), a personal digital assistant (PDA), a mobile communications device, a portable computer with built-in or add-on cellular communications, a portable game console, a global positioning system (GPS), a handheld industrial electronic device, or the like, or any combination thereof. The mobile device A 102 has at least one central processing unit (CPU) 308 which may be a scalar processor, a digital signal processor (DSP), a reduced instruction set (RISC) processor, or any other suitable processor. The central processing unit (CPU) 308, display 304, graphics engine 306, one or more user input devices 310, one or more storage mediums 312, input/output (I/O) port(s) 316, one or more wireless receivers and transmitters 318, and one or more network interfaces 320 may all be communicatively connected to each other via a system bus 324. The system bus 324 can employ any suitable bus structures or architectures, including a memory bus with memory controller, a peripheral bus, and/or a local bus.

The mobile device A 102 also includes one or more volatile and/or non-volatile storage medium(s) 312. The storage mediums 312 may be comprised of any single or suitable combination of various types of processor-readable storage media, and may store instructions and data acted on by CPU 308. For example, a particular collection of software instructions comprising software 314 and/or firmware instructions comprising firmware are executed by CPU 308. The software or firmware instructions generally control many of the operations of the mobile device A 102, and a subset of the software and/or firmware instructions may perform functions to operatively configure hardware and other software in the mobile device A 102 to provide the initiation, control and maintenance of applicable computer network and telecommunication links from the mobile device A 102 to another subscriber device, such as mobile device B 104 or other device 110, via the network 116 as shown in FIG. 1, using the wireless receiver(s) and transmitter(s) 318, network interface(s) 320, and/or I/O ports 316. Such software or firmware instructions may also implement the electronic determination and communication of location information and associated functions thereof described herein. For example, the software or firmware instructions may also include a phrase detection engine 326 that implements detecting at least one word entered in a text message being written on mobile device A 102 by a user on a user interface of a computerized messaging system of mobile device A 102 as the user is typing the text message; associating the at least one word with a location as the user is typing the text message with the at least one word; automatically visually marking the at least one word itself within the text message, notifying the user that the at least one word is associated with the location as the user is typing the text message with the at least one word; receiving input from the user resulting from the user selecting the at least one word in the text message while the at least one word is marked; and in response to the receiving the input from the user resulting from the user selecting the at least one word in the message while it is marked, inserting in the text message location information regarding the location associated with the at least one word. Thus, the phrase detection engine 326 may also include a text insertion engine of the computerized messaging system for insertion of the location information into the text message.

By way of example, and not limitation, the storage medium(s) 312 may be processor-readable storage media which may comprise any combination of computer storage media including volatile and nonvolatile, removable and non-removable media implemented in any method or technology for storage of information such as computer-readable instructions, data structures, program modules or other data. Combinations of any of the above should also be included within the scope of processor-readable storage media.

The storage medium(s) 312 may include system memory which includes computer storage media in the form of volatile and/or nonvolatile memory such as read-only memory (ROM) and random access memory (RAM). A basic input/output system (BIOS), containing the basic routines that help to transfer information between elements within mobile device A 102, such as during start-up or power-on, is typically stored in ROM. RAM typically contains data and/or program modules that are immediately accessible to and/or presently being operated on by CPU 308. By way of example, and not limitation, FIG. 3 illustrates software modules 314 including an operating system, application programs and other program modules that implement the processes and methods described herein.

The mobile device A 102 may also include other removable/non-removable, volatile/nonvolatile computer storage media drives. By way of example only, the storage medium(s) 312 may include a hard disk drive or solid state storage drive that reads from or writes to non-removable, nonvolatile media, a solid state memory drive that reads from or writes to a removable, nonvolatile magnetic disk, and an optical disk drive that reads from or writes to a removable, nonvolatile optical disk such as a DVD ROM or other optical media. Other removable/non-removable, volatile/nonvolatile computer storage media that can be used in an operating environment of the mobile device A 102 include, but are not limited to, flash memory cards, digital versatile disks, micro-discs, digital video tape, solid state RAM, solid state ROM, and the like. The storage medium(s) are typically connected to the system bus 324 through a non-removable memory interface. The storage medium(s) 312 discussed above and illustrated in FIG. 3, provide storage of computer-readable instructions, data structures, program modules and other data for the mobile device A 102. In FIG. 3, for example, a storage medium may store software 314 including an operating system, application programs, other program modules, and program data. The storage medium(s) 312 may implement a file system, a flat memory architecture, a database, or any other method or combination capable of storing such information.

A user may enter commands and information into the mobile device A 102 through touch screen display 304 or the one or more other input device(s) 310 such as a keypad, keyboard, camera, motion sensor, position sensor, light sensor, biometric data sensor, accelerometer, or a pointing device, commonly referred to as a mouse, trackball or touch pad. Other input devices of the mobile device A 102 may include a microphone, joystick, thumbstick, game pad, optical scanner, other sensors, or the like. These and other input devices are often connected to the CPU 308 through a user input interface that is coupled to the system bus 324, but may be connected by other interface and bus structures, such as a parallel port, serial port, wireless port, game port or a universal serial bus (USB). Generally, a unique software driver stored in software 314 configures each input mechanism to sense user input, and then the software driver provides data points that are acted on by CPU 308 under the direction of other software 314. The display is also connected to the system bus 324 via an interface, such as the graphics engine 306. In addition to the display 304, the mobile device A 102 may also include other peripheral output devices such as speakers, a printer, a projector, an external monitor, etc., which may be connected through one or more analog or digital I/O ports 316, network interface(s) 320 or wireless receiver(s) and transmitter(s) 318.

The mobile device A 102 may operate in a networked environment using connections to one or more remote computers or devices, such as a remote computer or device of the server 112, location information service provider 106, and/or other device 110 within or connected to the computer network 116 of FIG. 1 and described above. The remote computer within or connected to network 116 may be a personal computer, a server, a router, a network PC, a peer device or other common network node, and typically includes many or all of the elements described above relative to the computer system 200 of FIG. 2. Such connections to the network 116 may include connections over cellular, satellite, local area network (LAN) connections or wide area network (WAN) connections as described above, and/or other networks.

When used in a LAN or WAN networking environment, the mobile device A 102 may be connected via the wireless receiver(s) and transmitter(s) 318 and network interface(s) 320, which may include, for example, cellular receiver(s) and transmitter(s), Wi-Fi receiver(s) and transmitter(s), and associated network interface(s). When used in a WAN networking environment, the mobile device A 102 may include a modem or other means as part of the network interface(s) for establishing communications over the WAN, such as the Internet. The wireless receiver(s) and transmitter(s) 318 and the network interface(s) 320 may be communicatively connected to the system bus 324. In a networked environment, program modules depicted relative to the mobile device A 102, or portions thereof, may be stored in a remote memory storage device of a remote system.

The mobile device A 102 has a collection of I/O ports 316 and/or short range wireless receiver(s) and transmitter(s) 318 and network interface(s) 320 for passing data over short distances to and from the mobile device A 102 or for coupling additional storage to the mobile device A 102. For example, serial ports, USB ports, Wi-Fi ports, Bluetooth® ports, IEEE 1394 (i.e., FireWire), and the like can communicatively couple the mobile device A 102 to other computing apparatuses. Compact Flash (CF) ports, Secure Digital (SD) ports, and the like can couple a memory device to the mobile device A 102 for reading and writing by the CPU 308 or couple the mobile device A 102 to other communications interfaces such as Wi-Fi or Bluetooth transmitters/receivers and/or network interfaces.

Mobile device A 102 also has a power source 322 (e.g., a battery). The power source 322 may supply energy for all the components of the mobile device A 102 that require power when a traditional, wired power source is unavailable or otherwise not connected. Other various suitable system architectures and designs of the mobile device A 102 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, flash drives, or any other machine-readable or processor-readable storage medium wherein, when the program code is loaded into and executed by a machine, such as a processor of a computer or mobile device, the machine becomes an apparatus for practicing various embodiments. In the case of program code execution on programmable computers or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high-level procedural or object-oriented programming language to communicate with a computer system including the computer system 200 depicted in FIG. 2 and also in FIG. 3 of mobile device A 102. However, the program(s) can be implemented in assembly or machine language, if desired. In any case, the language may be a compiled or interpreted language, and combined with hardware implementations.

Figure 4:
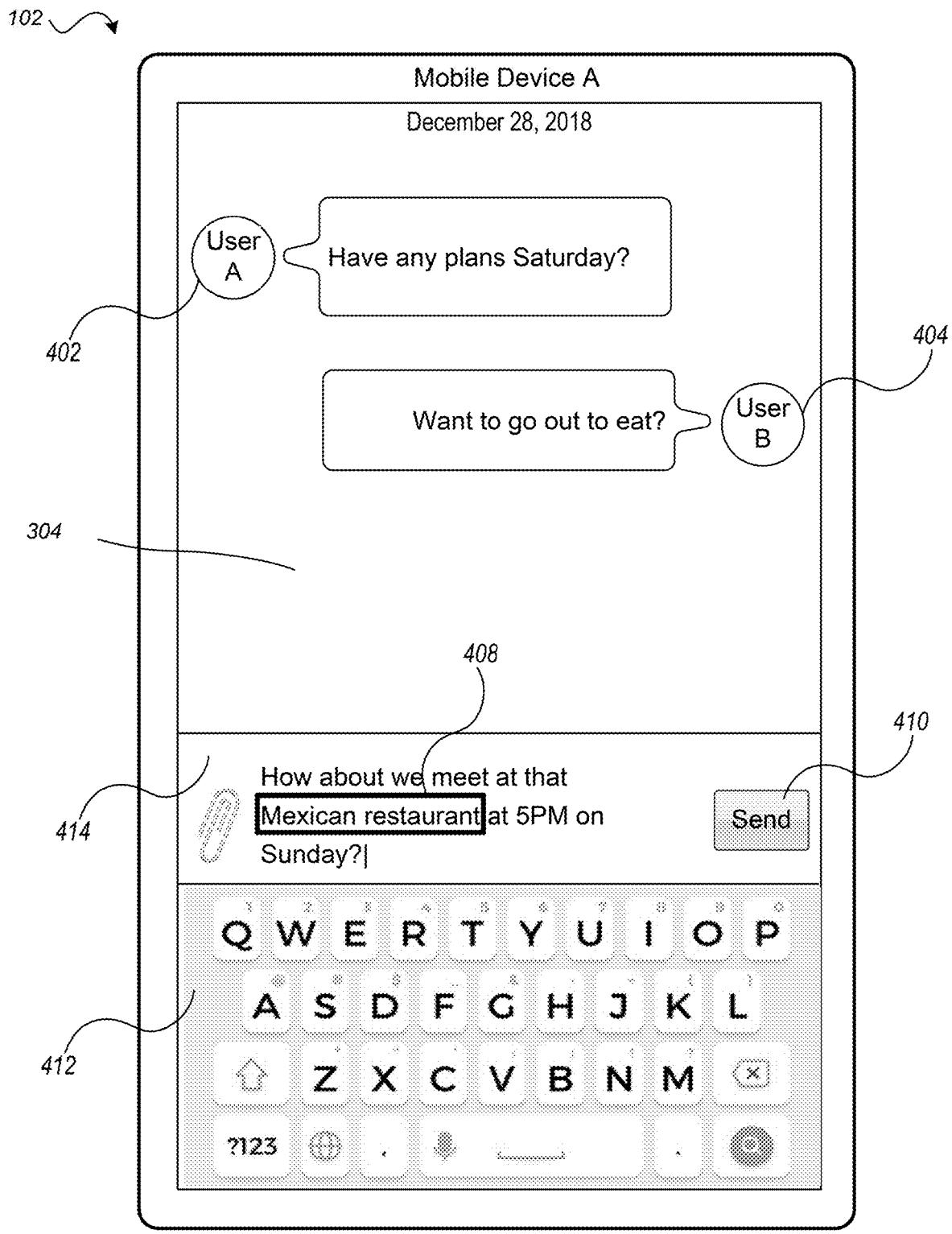
FIG. 4 is a schematic view of a mobile device displaying a user interface of a messaging application implementing a feature of visually marking at least one word within the text message, notifying the user that the at least one word is associated with a detected location as the user is entering the text message, according to one example illustrated embodiment.

FIG. 4 is a schematic view of mobile device A 102 displaying a user interface of a messaging application, which is one example of a computerized messaging system, implementing a feature of visually marking at least one word within the text message, notifying the user that the at least one word is associated with a detected location as the user is typing the text message, according to one example illustrated embodiment.

Shown on the touchscreen display 304 of mobile device A 102, is an example user interface of a messaging application running on mobile device A 102. As shown on the user interface, User A 402, who is the user of mobile device A 102, has sent a text message "Have any plans Saturday?" to User B 404, who is the user of mobile device B 104. In reply, the user interface shown on the touchscreen display 304 of mobile device A 102 displays the reply message from User B 404 "Want to go out to eat?". Near the bottom of the touchscreen display 304 is the portion of the user interface of the messaging application that includes the keyboard 412 and the text buffer 414, which enable the user to type and edit messages in the text buffer 414 using the keyboard 412 before sending the message using the send button 410. As shown in FIG. 4, User A 402 is currently typing a message to User B 404 in reply to the message "Want to go out to eat?" from user B. The text of the message currently being composed by User A 402 is displayed in the text buffer 414 as User A 402 is typing the message using the keyboard 412.

As User A is typing the message, the applicable software of the messaging application running on mobile device A 102 and/or other applicable text entry software running on mobile device A 102, which may comprise, use or be included as part of the phrase detection engine 326 of software 314 shown in FIG. 3, detects that the user has entered a noun or phrase representing a place. In the present example, the mobile device A 102 has detected that the phrase "Mexican restaurant" has been typed by User A of mobile device A 102, and that this phrase represents a name or other identifier (other than a specific address or location coordinates) of a place or location of interest. The phrase detection engine 326 may then determine whether there is location data available for that place identifier or name. For example, this may be via an Internet or browser search, data resulting from web site scraping, a search of a database of location names and addresses or coordinates and/or a search of previous locations visited by the user or mobile device A 102, e.g., as indicated by location history of a GPS or navigation system or location history of the user indicated in social media accounts, pictures and/or videos associated with the user and/or mobile device A 102. For example, the phrase detection engine 326 may determine a noun representing a name of a place has been entered and that place has been visited by the user based on location tags or metadata associated with a photograph of the user taken at that location. As a result, the phrase detection engine 326 determines that the name of that place typed into the message is a location of interest that has specific location data (e.g., an address or GPS coordinates) available.

In response to this detection, the phrase detection engine 326 of mobile device A 102 visually marks the phrase "Mexican restaurant" with a marker 408 (in this case, a box) while the user is typing the message into text buffer 414. Such a marker 408 may be selectable by the user (or may indicate that the phrase marked is selectable by the user) and may indicate that there is location data available associated with the phrase "Mexican restaurant". For example, based on the GPS location history of the mobile device A 102 of the user previously being at Margarita Village on 123 Oak St. (which is classified as a Mexican restaurant) and a photograph of the user as identified by the phrase detection engine 326 on a social media account of the user tagged with an address or GPS location corresponding to Margarita Village on 123 Oak St., the phrase detection engine 326 of mobile device A 102 visually marks the phrase "Mexican restaurant" with a marker 408, indicating there is location data available associated with that phrase (i.e., the address of GPS coordinates of Margarita Village on 123 Oak St). Furthermore, the context in which the name of the place is used in the message being typed may inform the phrase detection engine 326 which location data, if any, is available and should be used as being possibly associated with the location name. For example, the use of the word "that" or "the" before "Mexican restaurant" may indicate to the phrase detection engine 326 that "Mexican restaurant" has some existing significance or relevance to the intended recipient of the message (e.g., there is a particular Mexican restaurant that is known and familiar to both the sender and recipient). Therefore, the phrase detection engine 326 may search resources such as social media and location history of the recipient as well to determine which possible exact location data should be associated with "that Mexican restaurant" as typed in the text buffer 414.

The phrase detection engine 326 of software 314 may include natural language processing (NLP) functionality that may include speech recognition and/or natural language understanding techniques that are performed on the character stream being typed in the text buffer 414. Such NLP functionality may include techniques used by the phrase detection engine 326 to process the text being typed in the text buffer 414 as it is being typed to detect individual words or phrases that represent a place or location of interest. For example, the phrase detection engine 326 of software 314 may perform basic processing to convert this character stream being typed into text buffer 414 into a sequence of lexical items (words, phrases, and syntactic markers) which can then be used to understand the content, including identifying nouns and names of physical places such as restaurants, stores, movie theaters, a person's home (e.g., "John's house" or "John's place"), etc.

For example, the phrase detection engine 326 may perform structure extraction on the character stream being typed in the text buffer 414, including identifying fields and blocks of content based on tagging, and identify and mark sentence, phrase, and paragraph boundaries, which may be used by the phrase detection engine 326 when doing entity extraction and NLP, since they serve as useful breaks within which analysis occurs. Various example tools available for implementing such NLP techniques include, but are not limited to, Lucene Segmenting Tokenizer and the Open NLP sentence and paragraph boundary detectors.

The phrase detection engine 326 may then perform language identification on the character stream being typed in the text buffer 414, which detects the human language for the entire message and for each paragraph or sentence. Language detectors are useful to determine what linguistic algorithms and dictionaries the phrase detection engine 326 will apply to the text. Various example tools available for implementing such NLP techniques include, but are not limited to, Google Language Detector, the Optimize Language Detector, the Chromium Compact Language Detector, and API tools include Bing Language Detection API, IBM Watson Language Identification, and Google Translation API for Language Detection.

The phrase detection engine 326 may then perform tokenization on the character stream being typed in the text buffer 414, which divides up the character stream into tokens which can be used for further processing to aid in parsing out of the character stream nouns and/or potential references to particular places that may have location data available. Tokens can be words, numbers, identifiers or punctuation (depending on the use case). Various example tools available for implementing such NLP techniques include, but are not limited to, the Lucene analyzers, the Open NLP Tokenizer, Rosette Base Linguistics, available from Basis Technology and the Natural Language Processing toolkit available from Search Technologies, which is part of Accenture. The phrase detection engine 326 may also perform acronym normalization and tagging in which acronyms may be specified as "T.G.I. Fridays" or "TGI Fridays", so these should be tagged and normalized. Search Technologies' token processing tool provides acronym normalization and tagging.

The phrase detection engine 326 may perform lemmatization and/or stemming on the character stream being typed in the text buffer 414, which reduces word variations to simpler forms that increases the coverage of NLP utilities. In particular, lemmatization uses a language dictionary to perform an accurate reduction to root words. Such lemmatization tools are available from Search Technologies and Basis Technologies. Stemming uses simple pattern matching to simply strip suffixes of tokens (e.g., remove "s", remove "ing", etc.). The Open Source Lucene analyzers provide stemming for many languages. The phrase detection engine 326 may also perform decompounding. In particular, compound words may often be split into smaller parts to allow for more accurate NLP.

The phrase detection engine 326 may also perform entity extraction on the character stream being typed in the text buffer 414. Entity extraction includes identifying and extracting entities (people, places, companies, etc.) and simplifies downstream processing. For example, the phrase detection engine 326 may use regex extraction, which is useful for extracting phone numbers, ID numbers (e.g., SSN, driver's licenses, etc.), e-mail addresses, numbers, URLs, hashtags, credit card numbers, and similar entities. The phrase detection engine 326 may perform dictionary extraction, which uses a dictionary of token sequences and identifies when those sequences occur in the text. Dictionary extraction is useful for detecting known entities, such as colors, units, sizes, employees, business groups, drug names, products, brands, and so on. The phrase detection engine 326 may perform complex pattern-based extraction, which is useful for detecting people names (made of known components), business or place names (made of known components) and context-based extraction scenarios (e.g., extract an item based on its context). The phrase detection engine 326 may perform statistical extraction, which uses statistical analysis to do context extraction. Statistical extraction is useful for detecting people names, company names, geographic entities which are not previously known and inside of well-structured text.

The phrase detection engine 326 may perform phrase extraction on the character stream being typed in the text buffer 414, which extracts sequences of tokens (phrases) that have a strong meaning which is independent of the words when treated separately. These sequences are treated as a single unit when doing NLP. For example, the place name "Cheesecake Factory" has a strong meaning as a well-known chain restaurant, which is independent of the words "cheesecake" and "factory" when used separately. Many names of places are made up of these sorts of phrases which are in common usage and are better treated as a unit rather than separately. Some example techniques to extract phrases include: part of speech tagging, which identifies phrases from noun or verb clauses; statistical phrase extraction, which identifies token sequences which occur more frequently than expected by chance; and hybrid, which uses both techniques together and is a more accurate method.

Such NLP functionality may include rule-based techniques and/or artificial intelligence and supervised or unsupervised machine learning processes and functionality to detect such words and phrases and their potential relevancy to potential location data. For example, the software 314 may include a phrase detection engine that may cross-reference the currently detected word or phrase that was just typed into text buffer 414 with previous messages typed and/or other input from the user or other users to determine whether such words or phrases were previously typed, and to determine their relevance based on the context in which the word or phrases were used and/or the frequency with which they were used by that particular user. In one example, if the word or phrase is one recognized by the phrase detection engine 326 to be a physical place to which the user or a person has been to, is likely to go to, or could go to, such a word or phrase would be determined to be a candidate for detection as potentially having location data available to be possibly inserted into the message while it is being typed, before it is sent or after it is sent. For example, the phrase detection engine 326 may determine that the phrase "Mexican restaurant" has location information available based on the previous locations categorized or tagged as Mexican restaurants visited by the mobile device A 102 as indicated by the location tacking, mapping, location service, navigation, GPS or other functionality of the mobile device A. This may include the locations of the previous locations categorized or tagged as Mexican restaurants visited by the mobile device A 102. For example, such a determination may be based on frequency of visits, duration of visits, number of visits within a threshold time period (which may be selectable by the user) and distance of the previous locations visited from the current location of mobile device A 102.

In some embodiments, the phrase detection engine may cross-reference detected nouns or names with one or more databases of location or place names to determine whether the noun is a name of a location or place for which location information is available. In one example embodiment, using NLP techniques, the phrase detection engine may detect a noun or name has just been typed in the text buffer 414 and perform an Internet search, map search and/or previous visited location search (e.g., utilizing a map or location services application programming interface (API) of a map or location services application running on the mobile device A 102, location information service provider 106, and/or server 112) to determine if the noun or name identifies one or more actual physical locations. For example, such location may be one or more of: a restaurant, a store, an office, a manufacturing facility, a coffee shop, a construction site, a workplace, a residence, a sporting event venue, a music venue, a movie theater, a bar, an amusement park, a public transportation station, an intersection, a park, a landmark, a public facility, a zoo, a temporary store, an event venue.

Machine learning functionality of the phrase detection engine 326 may use, as a learning dataset, a set of messages sent and/or received by the user of mobile device A 102 and/or other users. In one example, such learning datasets may be tagged or labeled with words or phrases that are places or items of interest that may have location data associated with such items. The machine learning algorithm is then trained on the labeled dataset and gives the desired output (the detection of words or phrases that are places or items of interest that have location data associated with them). During the testing phase, the machine learning algorithm is fed with unobserved data, and detects words or phrases that are places or items of interest that may have location data associated with them based on the training phase. As the user continues to use the interface of the computerized messaging system of mobile device A 102 to send messages, the machine learning algorithm continues to learn based on these messages. For example, if the user types a name of a place into the text buffer 414 and then manually inserts or sends a message including the address of that place, the machine learning algorithm of the phrase detection engine 326, for future reference, will associate the name of that place as being or word or phrase that has location data associated with it (i.e., the address typed in by the user), such that the phrase detection engine 326 may automatically mark the phrase and/or insert into the text message the address going forward. Such messages may be included as part of the training dataset, such that the context in which the address or GPS coordinates were manually inserted by the user into the message may be taken into consideration for detecting place names that are typed in similar contexts.

In various embodiments, the marker 408 may include different or additional markers than the box shown in FIG. 4. In particular, the marker 408 may include one or more graphical user interface elements resulting from the phrase detection engine 326 performing, but not limited to the phrase detection engine 326 performing, one or more of: highlighting at least one word itself within the message to notify the user that the at least one word is associated with a location as the user is typing the message; bolding the at least one word itself within the message to notify the user that the at least one word is associated with the location as the user is typing the text message; underlining the at least one word itself within the message to notify the user that the at least one word is associated with the location as the user is typing the text message; italicizing the at least one word itself within the message to notify the user that the at least one word is associated with the location as the user is typing the text message; outlining the at least one word itself within the message to notify the user that the at least one word is associated with the location as the user is typing the message; changing a color of the at least one word itself within the message to notify the user that the at least one word is associated with the location as the user is typing the message; and placing a symbol adjacent to the at least one word itself within the message to notify the user that the at least one word is associated with the location as the user is typing the text message.

If the user selects to send the message (e.g., by pressing the send button 410) without indicating to insert any location information, (e.g., by not selecting the marker 408 or the phrase "Mexican restaurant" as marked by the marker 408) then the message will be sent to the recipient as typed by the user without insertion of any location information.

Figure 5A:
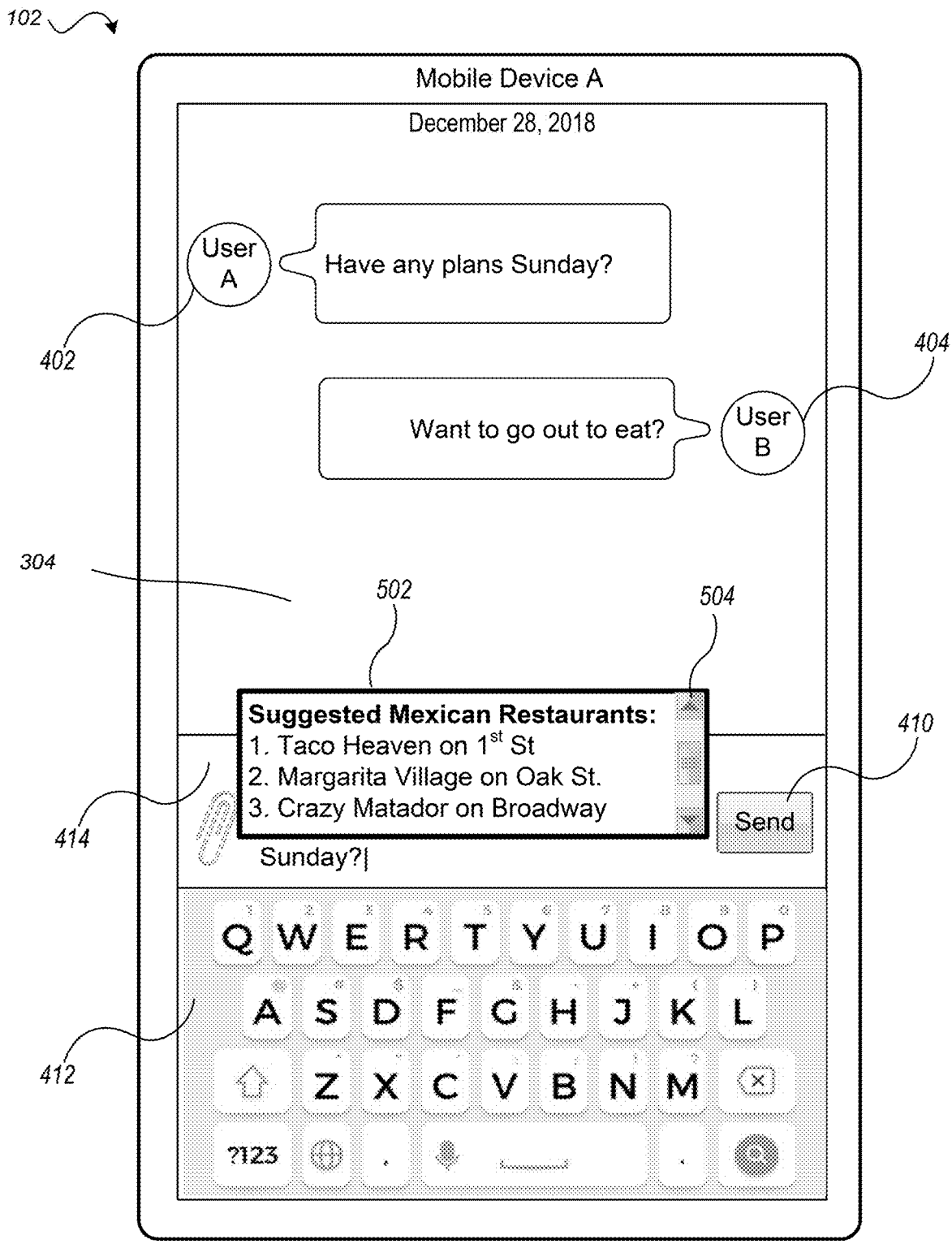
FIG. 5A is a schematic view of a mobile device displaying a user interface of a messaging application implementing a feature of displaying a graphical user interface item including menu of selectable options associated with the at least one word entered in the text message by the user, according to one example illustrated embodiment.

FIG. 5A is a schematic view of mobile device A 102 displaying a user interface of a messaging application implementing a feature of displaying a graphical user interface item including a menu of selectable options 502 associated with a phrase entered in the text message by the user, according to one example illustrated embodiment.

In response to the user selecting the marker 408 or the phrase "Mexican restaurant" as marked by the marker 408 shown in FIG. 4, the phrase detection engine 326 causes the menu of selectable options 502 to be displayed on the display 304 (e.g., as a pop-up menu). The menu of selectable options 502 includes selectable location data associated with the detected phrase "Mexican restaurant". For example, the menu of selectable options 502 may be displayed before the user sends the message, such that the user may select location data from the menu of selectable options 502 to be interested in to the message either before or after it is sent. In this manner, the recipient may receive the location data (e.g., the address or GPS coordinates) without the sender having to manually search for and type or copy and paste the location data into the text message before sending it. This improves the technology of electronic communications by improving the efficiency and speed of composing and sending electronic messages via improved graphical user interfaces and automated systems to generate relevant text.

The user selects the marker 408 or the phrase "Mexican restaurant" as marked by the marker 408 shown in FIG. 4 by pressing, tapping, double tapping, holding, swiping, clicking, double clicking or other gesture. For example, when typing a text massage, tapping a word may normally move the cursor to that tapped position in the word and pressing and holding on a typed word may normally indicate selection of that word for cutting or copying. Therefore, in one embodiment swiping on that word or phrase while it is marked by a marker such as marker 408 (as opposed to tapping or pressing and holding the word), may indicate selection of that word or phrase to cause display of the associated location information (e.g., the menu of selectable options 502) that may be inserted into the message. In other embodiments, pressing and holding that word or phrase for at least a threshold amount of time while it is marked by a marker such as marker 408 (as opposed to tapping or pressing and holding the word for less than the threshold amount of time) may indicate selection of that word or phrase to cause display of the associated location information (e.g., the menu of selectable options 502), which may be available for insertion into the message.

In other embodiments, receiving as input indication that the user performed a distinctive particular gesture on a typed word or phrase, even without it being already marked, may indicate selection of that word or phrase to cause display of the associated location information, if any (e.g., the menu of selectable options 502), which in some embodiments, may be inserted into the message upon further selection of the location information displayed. For example, a user may double-tap on a typed word or phrase to cause the phrase detection engine 326 to display available location information (e.g., address or GPS coordinates) associated with that word or phrase (e.g., the menu of selectable options 502), which, in some embodiments, may be inserted into the message upon further selection of the location information displayed. In some embodiments, the phrase detection engine 326 may determine which gestures are already being used to indicate other actions based on the particular computerized messaging system, and select a different gesture to use to indicate selection of a word or phrase to show location information associated with the word or phrase, which may be available for insertion into the message before or after it is sent.

In the present example, the menu of selectable options 502 includes three names of different Mexican restaurants that the phrase detection engine 326 determined to be possibly associated with the phrase "Mexican restaurant" typed by the user into the text buffer 414. For example, this determination may be made based on a search for Mexican restaurants via the Internet or a mapping system performed by the phrase detection engine 326 and/or for Mexican restaurants located near to (e.g., within a threshold distance or threshold driving time from) the current location of the mobile device A 102. Such a search via the Internet or a mapping system may also or instead be performed by or via the location information service provider 106 and/or the server 112 (which in some embodiments may be an Internet, web or cloud computing server). This determination may instead or also be based on previous locations visited by the mobile device A 102 and/or user associated with the mobile device A 102 as indicated by location history of a GPS, navigation system or location history of the mobile device A 102 or the user indicated in social media accounts, posts, pictures and/or videos associated with the user and/or mobile device A 102. In some embodiments, this may be performed using object and/or facial recognition techniques to determine who appear in particular photos and videos and the location at which photos or videos were taken. Some or all of such location history of the GPS, navigation system or location history of the mobile device A 102 or the user indicated in social media accounts, pictures and/or videos associated with the user and/or mobile device A 102 may be stored on the mobile device A 102 and/or stored on a remote system accessible by the mobile device A 102, such as, for example, the location information service provider 106 or the server 112. Also, performance of the facial recognition techniques to determine who appear in particular photos and videos and the location at which photos or videos were taken may be by the mobile device A 102, the location information service provider 106 and/or the server 112.

The menu of selectable options 502 may be contained in a bounded area, window or box that pops up and is overlaid on or generated on the display 304 adjacent to or in proximity to the marker 408 or the phrase "Mexican restaurant" as marked by the marker 408 in response to selection of the marker 408 or the phrase "Mexican restaurant" as marked by the marker 408. In some embodiments, the menu of selectable options 502 may comprise a scrollable list that is scrollable by use of a scroll bar 504, such that the user may press, hold and move the scroll bar 504 to scroll up and down the list to view all the selectable options, some of which may not be initially viewable due to the size of the area, window or box that contains the menu of selectable options 502.

In some embodiments, instead of a menu of selectable options 502, a single option may be displayed if, for example, there is only one address associated with the detected word or phrase. In some embodiments, only the specific name of the place associated with the detected word or phrase is presented, while in other embodiments, some or all of the address or other information may be displayed identifying a particular location or place. The location information presented is information that may in some way be more specific than the detected phrase itself. For example, if the detected phrase is "Mexican restaurant", then a list of possible Mexican restaurant names is displayed. If the detected phrase is "Taco Heaven", then the location information displayed upon selected of the phrase "Taco Heaven" is the address or GPS coordinates of Taco Heaven. The associated location information displayed menu of selectable options 502 may be or include one or more hyperlinks to further information regarding the particular option displayed in the menu, such as a link to the web site of the place listed in the menu, a social media account of the place listed in the menu, an interactive map to the place listed in the menu, directions to the place listed in the menu, a link to activate or launch a mapping or navigation system of the mobile device A 102 or mobile device of the recipient of the message with the address or GPS coordinates of the place listed in the menu entered into the mapping or navigation system and reviews of the place listed in the menu. In various embodiments, additional, different or less location information may be displayed than that shown in the menu of selectable options 502. Also, additional, different or less location information may be inserted into the message in response to selection by the user of the displayed location information in the menu of selectable options 502.

The menu of selectable options 502 may list location information in various different orders. For example, the menu of selectable options 502 may list location information in order of relevancy as determined by the phrase detection engine 326 based on location history of a GPS, navigation system or location history of the mobile device A 102 or the user indicated in social media accounts, posts, pictures and/or videos associated with the user and/or mobile device A 102. For example, the number of mentions on social media accounts of the user and visits to the name of the place or address associated with the name of the place listed in the menu of selectable options 502 may indicate a higher relevancy to the user and cause the option including the name of that place to be listed higher in the menu of selectable options 502.

The menu of selectable options 502 may also have a displayed selectable option to not insert any location information into the text message and/or close the menu of selectable options 502. If the user selects to send the message (e.g., by pressing the send button 410) without indicating to insert any location information, (e.g., by closing menu of selectable options 502, selecting the option to not insert any location information into the text message or by not selecting anything from menu of selectable options 502) then the message will be sent to the recipient as typed by the user without insertion of any location information.

Figure 5B:
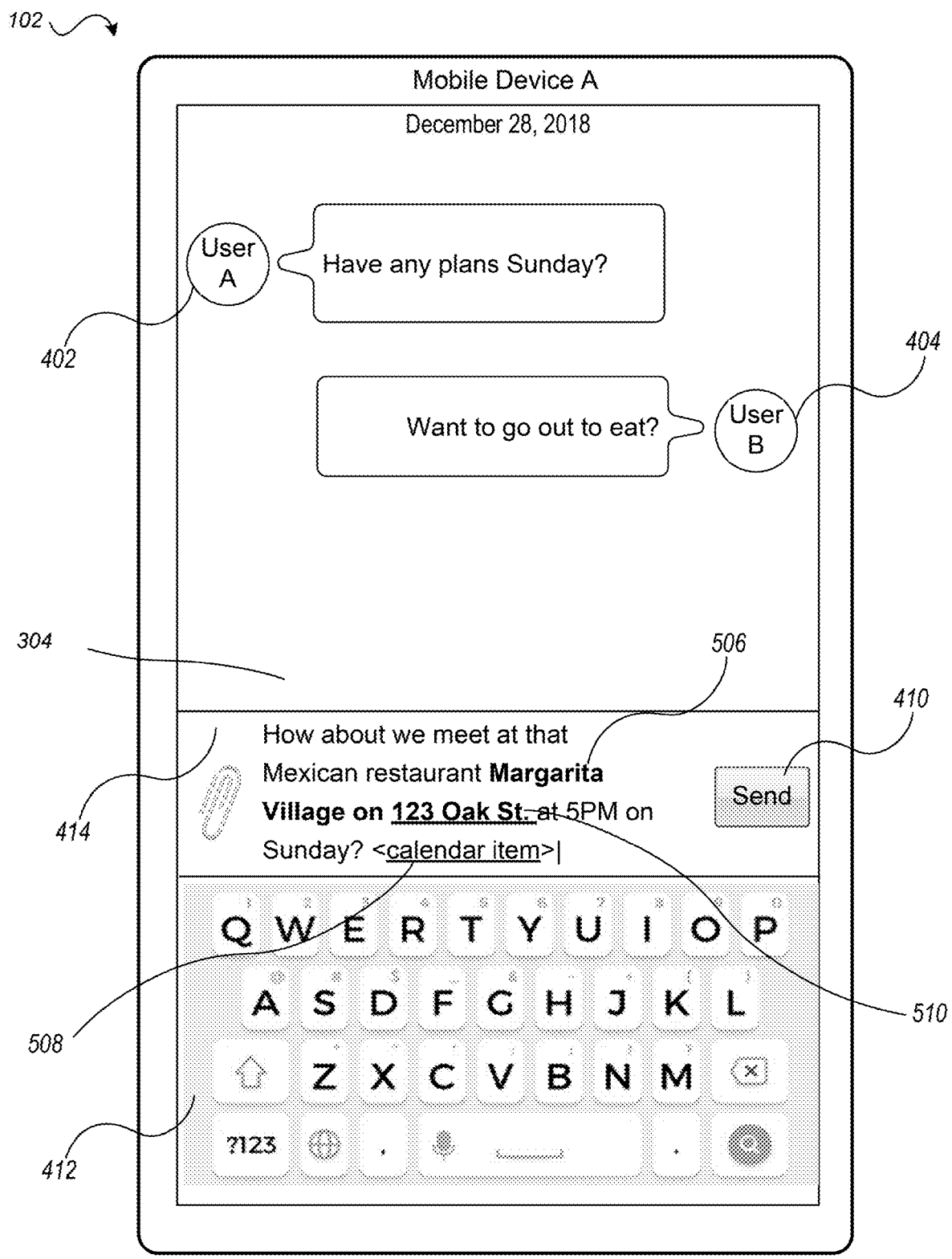
FIG. 5B is a schematic view of a mobile device displaying a user interface of a messaging application implementing a feature of insertion into the text message of a location and associated address selected from the menu of selectable options that are associated with the at least one word entered in the text message, according to one example illustrated embodiment.

FIG. 5B is a schematic view of the mobile device A 102 displaying a user interface of a messaging application implementing a feature of insertion into the text message of a place name and associated address selected from the menu of selectable options 502 shown in FIG. 5A that are associated with the detected word or phrase typed in the text message, according to one example illustrated embodiment.

In response to selection by the user (e.g., by pressing, tapping, swiping or clicking) of the "Margarita Village" option from the menu of selectable options 502 shown in FIG. 5A, the phrase detection engine 326 inserts into the message being typed in the text buffer 414 location information, such as the place name 506 (e.g., "Margarita Village") and the address 510 (e.g., "123 Oak St.") associated with the detected phrase "Mexican restaurant" typed by the user and the "Margarita Village" option selected by the user from the menu of selectable options 502 shown in FIG. 5A. The user may continue to edit the message in the text buffer 414 and, when finished, may send the message to the recipient (e.g., by pressing the send button 410). The recipient will then receive the message with the location information (e.g., place name and address of the of the applicable Mexican restaurant) included in the message without the sender having to manually search for and type or copy and paste the location data into the text message before sending it. This improves the technology of electronic communications by improving the efficiency and speed of composing and sending electronic messages via improved graphical user interfaces and automated systems to generate relevant text.

The phrase detection engine 326 may highlight or otherwise mark the text that was inserted in the message in the text buffer 414 to indicate that it was inserted in the message by the phrase detection engine 326. The text that is inserted in the message in the text buffer 414 may be or include one or more hyperlinks to further information regarding the particular option displayed in the menu. In the present example, the text of the address "123 Oak St." contains a hyperlink to activate the mapping or navigation system of the sender and/or recipient to launch and be directed to the address "123 Oak St." Other inserted links may include, but are not limited to, one or more of: a link to a web site associated with the inserted location information, a social media account or posts associated with the inserted location information, an interactive map to the place associated with the inserted location information, marketing material or promotions associated with the inserted location information, directions to the place associated with the inserted location information, a link to activate or launch a mapping or navigation system of the mobile device A 102 or mobile device of the recipient of the message with the address or GPS coordinates of the place associated with the inserted location information entered into the mapping or navigation system, and reviews of the place associated with the inserted location information. In various embodiments, additional, different or less location information may be inserted in the message than that shown in FIG. 5B. Also, additional, different or less location information may be inserted into the message in response to selection by the user of the displayed location information in the menu of selectable options 502.

In some embodiments, a calendar item 508 associated with the location information may be initiated or generated by the phrase detection engine 326. Such a calendar item 508 may be initiated or generated in response to the detection by the phrase detection engine 326 of location information being associated with the word or phrase being typed in the message in text buffer 414. In some embodiments, the calendar item 508 may be initiated or generated in response to the selection by the user of particular location information from the menu of selectable options 502. For example, the calendar item 508 may include the sender and recipients as attendees and the selected place indicated by the particular location information selected from the menu of selectable options 502 as a location for a meeting or appointment. Such a calendar item may be an object or link to an object that may be electronically placed on or inserted to a digital calendar of the sender and/or recipient of the message, which may be stored on the respective device of the sender and/or recipient or associated with an online account of the sender and/or recipient. The calendar item 508 or a link to the calendar item 508 may be inserted into the message being typed by the user in the text buffer 414, which may then be received by the recipient.

The recipient may then indicate selection of the calendar item (e.g., by pressing or tapping the link in the message to the calendar item) in the received message to place that calendar item of the recipient's electronic calendar. In some embodiments, the calendar item is automatically placed on the electronic calendar of the sender upon detection by the phrase detection engine 326 of location information being associated with the word or phrase being typed in the message or upon the selection by the user of particular location information from the menu of selectable options 502. In other embodiments, the sender is provided, via a graphical user interface, an option to place such a calendar item on the sender's digital calendar and/or edit the calendar item before it is placed on the sender's digital calendar. In some embodiments, the calendar item is automatically placed on the electronic calendar of the recipient upon receipt of the message associated with the calendar item from the sender. In other embodiments, the recipient is provided, via a graphical user interface, an option to place such a calendar item on the recipient's digital calendar and/or edit the calendar item before it is placed on the sender's digital calendar. In some embodiments, the calendar item may be sent to the recipient after the message being typed in text buffer 414 is sent to the recipient.

The calendar item 606 may be generated based on the context of the message being typed (including the previous string of messages between the sender and recipient) and the detected word or phrase in the message being typed determined to be associated with the location information. For example, the calendar item may include date information for an appointment or meeting, information identifying to whom the text message is to be sent and the location information. To generate the calendar item, the phrase detection engine 326 may extract from the message being composed in text buffer 414 information regarding to whom the message is to be sent, date and time information from the message being composed in text buffer 414 and/or one or more previous text messages of the sender and/or recipient regarding a potential appointment associated with the detected word or phrase in the message being typed determined to be associated with the location information.

Figure 6:
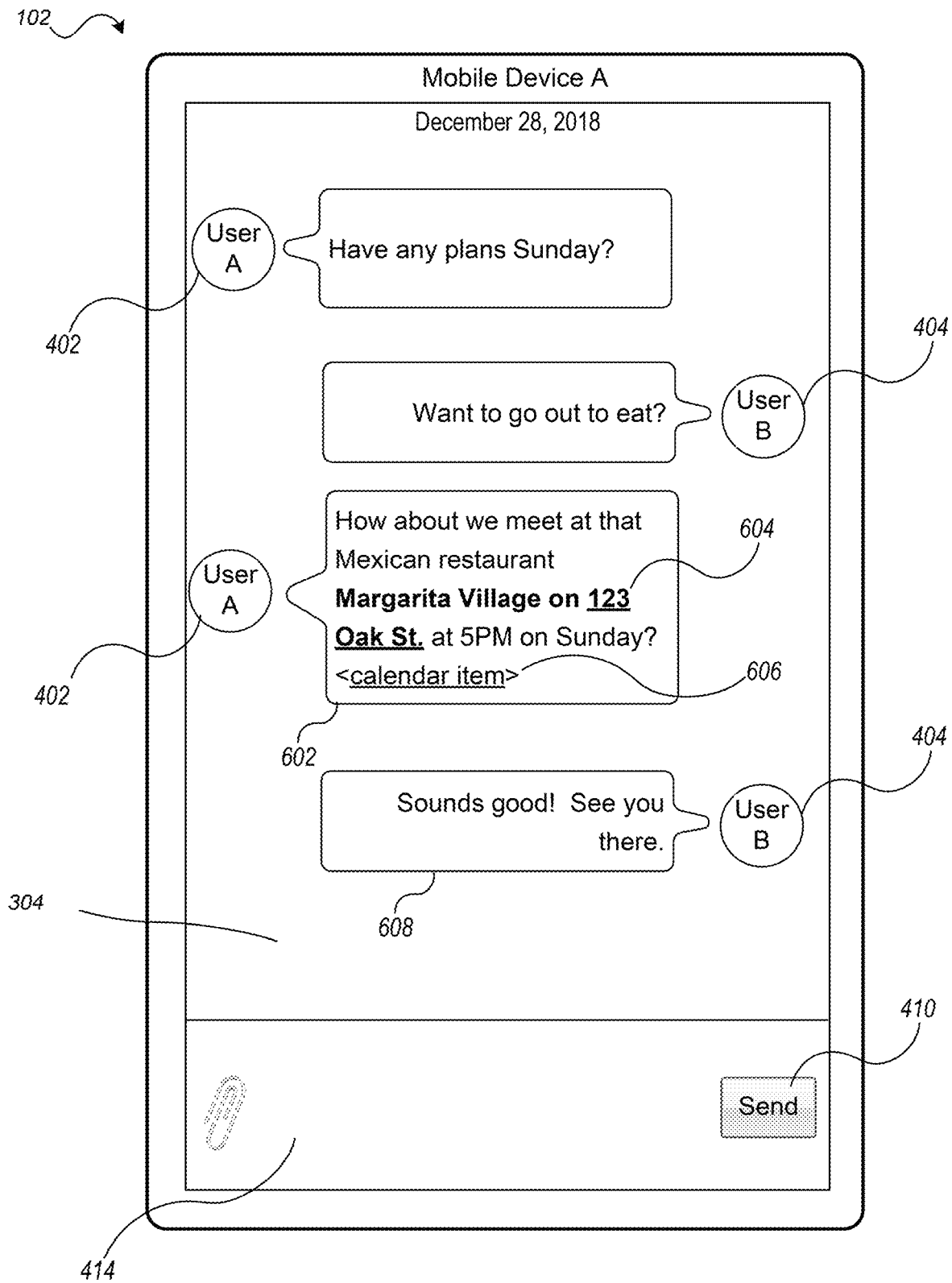
FIG. 6 is a schematic view of a mobile device displaying a user interface of a messaging application implementing a feature of sending a message with an inserted location and associated address selected from the menu of selectable options that are associated with the at least one word entered in the text message, according to one example illustrated embodiment.

FIG. 6 is a schematic view of mobile device A 102 displaying a user interface of a messaging application implementing a feature of sending a message 602 with an inserted location and associated address 604 selected from the menu of selectable options 502 that are associated with the at least one word entered in the message, according to one example illustrated embodiment.

In response to the user selecting to send the message being typed in the text buffer 414 of FIG. 5B (e.g., by selecting the send button 410), the message is sent to the recipient with the place name and address 604 as well as the calendar item 606 associated with the place name and address inserted into the message. FIG. 6 shows the message sent to the recipient on the display 304 of the mobile device A 102 of the sender in a conversation view. As shown, on the display 304, the place name and address 604, as well as the calendar item 606, are shown as being inserted into the message to the recipient. Note that after being sent, the message is no longer shown as being available for editing in the text buffer 414.

The recipient then replies with a reply message 608, stating "Sounds good! See you there" as a confirmation. In response to detecting, Using NLP techniques, that a confirmation is received from the recipient based on the day, time and place information extracted for the one or more messages between the sender and recipient, the phrase detection engine 326 on the sender's mobile device A 102 and/or the equivalent detection engine on the recipient's mobile device B 104 may place the calendar item 606 on the respective electronic calendars of the sender and/or recipient. In some embodiments, until confirmation is received, the phrase detection engine 326 or the sender's mobile device A 102, and/or the equivalent detection engine on the recipient's mobile device B 104, may place the calendar item 606 on the respective electronic calendars of the sender and/or recipient as meeting request or tentative meetings. In some embodiments, there may be additional recipients, such as in a group messages and the test insertion and calendar item generation and insertion may be applied to one or more of the recipients as described herein.

In some embodiments, the phrase detection engine 326 inserts the location information after the user selects to send the message but before the recipient receives the message, or sends it as metadata to the recipient's device along with the message. In other embodiments, the mobile device of the recipient (e.g., mobile device B 104) inserts the location information into the message when received as metadata along with the message from the sender. In some embodiments, the mobile device of the recipient may insert location data or perform the operations described herein to detect and mark words or phrases (but in the received message) for the recipient as having associated location information available, and may display a menu of selectable options including such location information for the recipient from which the recipient may select on the recipient's device.

Figure 7:
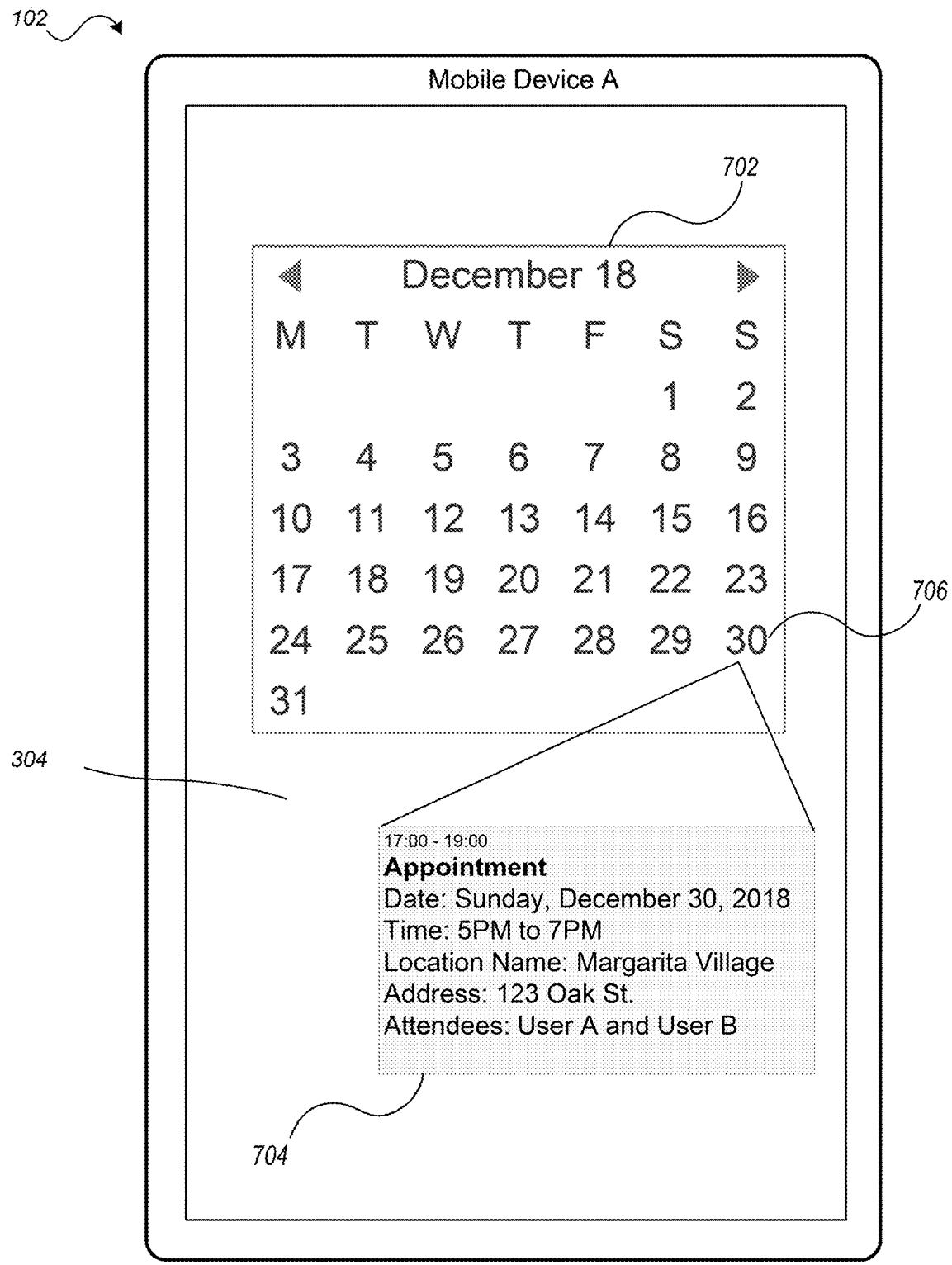
FIG. 7 is a schematic view of a mobile device displaying a user interface of a calendar application implementing a feature generating a calendar item based on information automatically extracted from the message, according to one example illustrated embodiment.

FIG. 7 is a schematic view of mobile device A 102 displaying a user interface of a calendar application implementing a feature generating a calendar item 704 based on information automatically extracted from the message, according to one example illustrated embodiment. In the example shown in FIG. 7, the calendar item 704 includes information based on one or more of the messages between the sender and recipient, including the message being typed in the text buffer 414 in the computerized messaging system of the sender's mobile device A 102. The phrase detection engine 326 may place or insert the calendar item 704 on the electronic calendar 702 of the sender and/or recipient based on such extracted information.

For example, the phrase detection engine 326 determines an appointment date 706 (Dec. 30, 2018) based on the date the message is being typed in the text buffer 414 or is sent (Dec. 28, 2018). For example, the determination may be based on the extracted text "have any plans Sunday" from a previous message of the sender and "How about we meet at that Mexican restaurant at 5 PM on Sunday" extracted from the message currently being typed by the sender in the text buffer 414 on Dec. 28, 2018. Using NLP techniques and context rules, the phrase detection engine 326 determines that the "Sunday" intended by the sender is Sunday, Dec. 30, 2018 because it is the next Sunday appearing on the calendar after Dec. 28, 2018 (the date on which the message is being typed or sent). Using NLP techniques, the phrase detection engine 326 determines that the appointment time is 5 PM based on the text "How about we meet at that Mexican restaurant at 5 PM on Sunday" extracted from the message currently being typed by the sender in the text buffer 414. The phrase detection engine 326 may have a setting or rule that the default length of a meeting at a restaurant (detected to a Mexican restaurant as shown above) is 2 hours. Thus, the meeting time of the calendar item 704 is determined to be 5 PM to 7 PM), which may be edited by the user after generation of the calendar item. Using NLP techniques, the phrase detection engine 326 may determine that the attendees for the calendar item are the sender and one or more recipients of the message being typed, based on extracting from the message information indicating the sender and the one or more recipients of the message. As shown above, the phrase detection engine 326 determines the location name and address based on the message being typed into the text buffer 414 and possibly other context information, and includes this as the location name and address for the calendar item 704.

In accordance with an aspect of the disclosure, the mobile devices 102 and 104 and other device 110 may contain discrete functional program modules that might make use of an application programming interface (API), or other object, software, firmware and/or hardware, to request services of one or more of the other entities within or connected to the network 116 or to request services of one or more applications or systems running on the mobile devices 102 and 104, location information service provider 106, server 112 and/or other device 110. For example, the phrase detection engine 326 of mobile device A 102 may communicate with one or more APIs of an existing messaging system or application running on mobile device A 102.

Such existing systems or applications running on mobile device A 102 with which the phrase detection engine 326 of mobile device A 102 may be a part of or may operably communicate with via APIs include, but are not limited to, one or more of: Short Message Service (SMS) applications, multimedia message (MMS) applications, texting applications, messaging applications, instant messaging (IM) applications, chat applications, video chat applications, Internet chat applications, Internet Relay Chat (IRC) applications, wireless messaging applications, telephone system texting applications, cellular-based telephone system texting applications, Internet-based messaging applications, web browsing applications, Internet or web search applications, email systems, messaging systems that use mail protocols such as SMTP over TCP/IP, emergency services messaging applications, social messaging applications, social networking platform messaging applications, social networking platform chat applications, chatbot applications, smartbots, talkbots, chatterbots, Bots, IM bots, interactive agents, conversational interface or artificial conversational entities, voice messaging applications, voice-to-text messaging applications, text-to-voice messaging applications, calendar applications, scheduling applications, project management applications, address book applications, contact management applications, contact list applications, mapping applications, GPS systems, navigations systems, location services systems, electronic dictionaries, NLP systems, web page scraping systems, data aggregation systems, data analytics systems, machine learning systems, artificial intelligence systems, neural network systems and databases. Thus, the phrase detection engine 326 of mobile device A 102 may be integrated into any of such applications or systems above as part of such an application or system, or in some embodiments, may comprise or be part of a standalone, separately downloadable application or plugin that may improve and/or control such existing systems by communication with such existing systems via one or more APIs provided by such systems.

Figure 8:
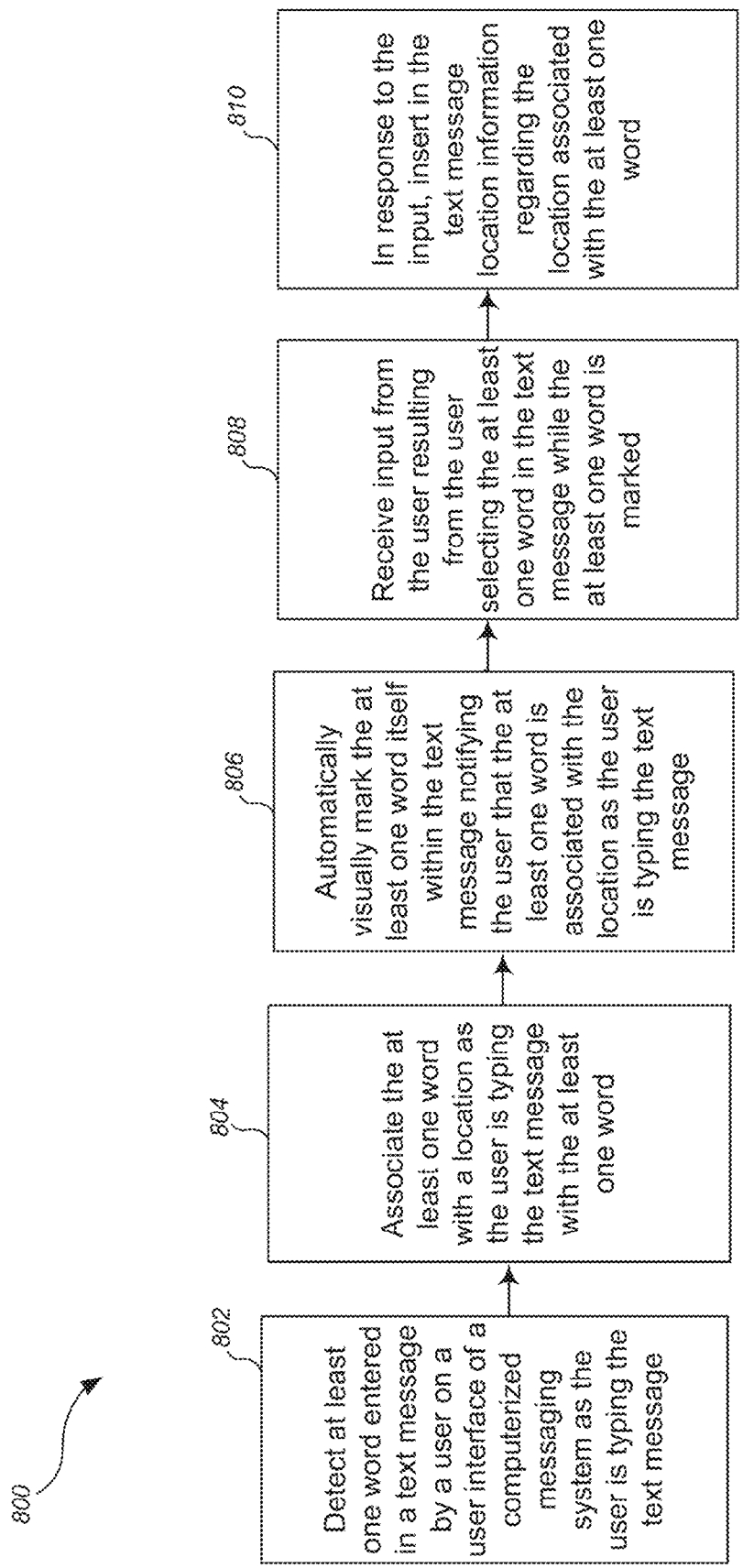
FIG. 8 is a flow diagram showing a method of inserting location information in a text message, according to one illustrated embodiment.

FIG. 8 is a flow diagram showing a method 800 of inserting location information in a text message, according to one illustrated embodiment. At 802, the system detects at least one word entered in a text message by a user on a user interface of a computerized messaging system as the user is entering the text message.

At 804, the system associates the at least one word with a location as the user is entering the text message with the at least one word.

At 806, the system automatically visually marks the at least one word itself within the text message, notifying the user that the at least one word is associated with the location as the user is entering the text message with the at least one word.

At 808, the system receives input from the user resulting from the user selecting the at least one word in the text message while the at least one word is marked.

At 810, in response to the receiving the input from the user resulting from the user selecting the at least one word in the message while it is marked, the system inserts in the text message location information regarding the location associated with the at least one word.

Figure 9:
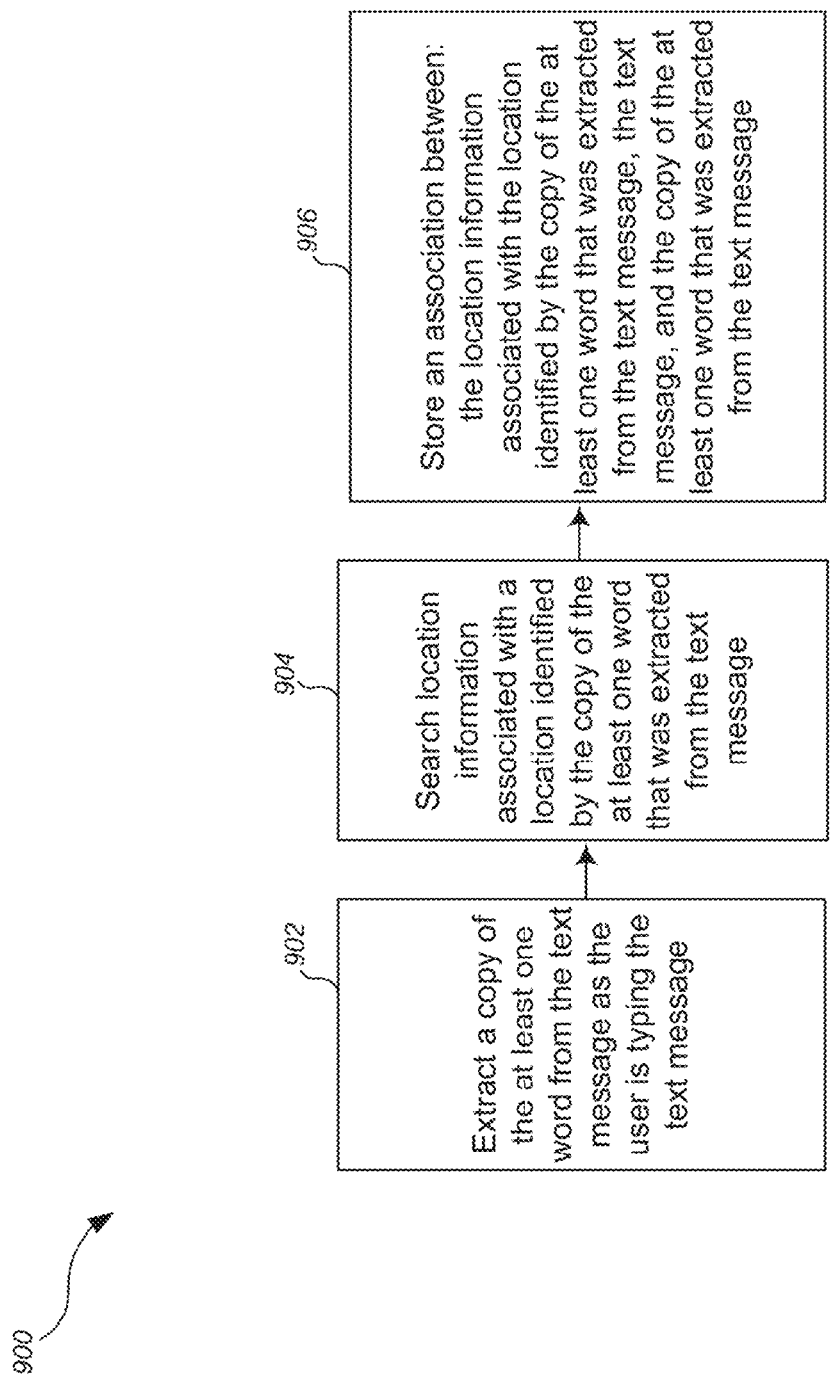
FIG. 9 is a flow diagram showing a method for associating at least one word in a text message with a location as the user is entering the text message, useful in the method shown in FIG. 8, according to another illustrated embodiment.

FIG. 9 is a flow diagram showing a method 900 for associating at least one word in a text message with a location as the user is entering the text message, useful in the method shown in FIG. 8, according to another illustrated embodiment.

At 902, the system extracts a copy of the at least one word from the text message as the user is entering the text message.

At 904, the system searches location information associated with a location identified by the copy of the at least one word that was extracted from the text message.

At 906, the system stores an association between: the location information associated with the location identified by the copy of the at least one word that was extracted from the text message, the text message, and the copy of the at least one word that was extracted from the text message.

Figure 10:
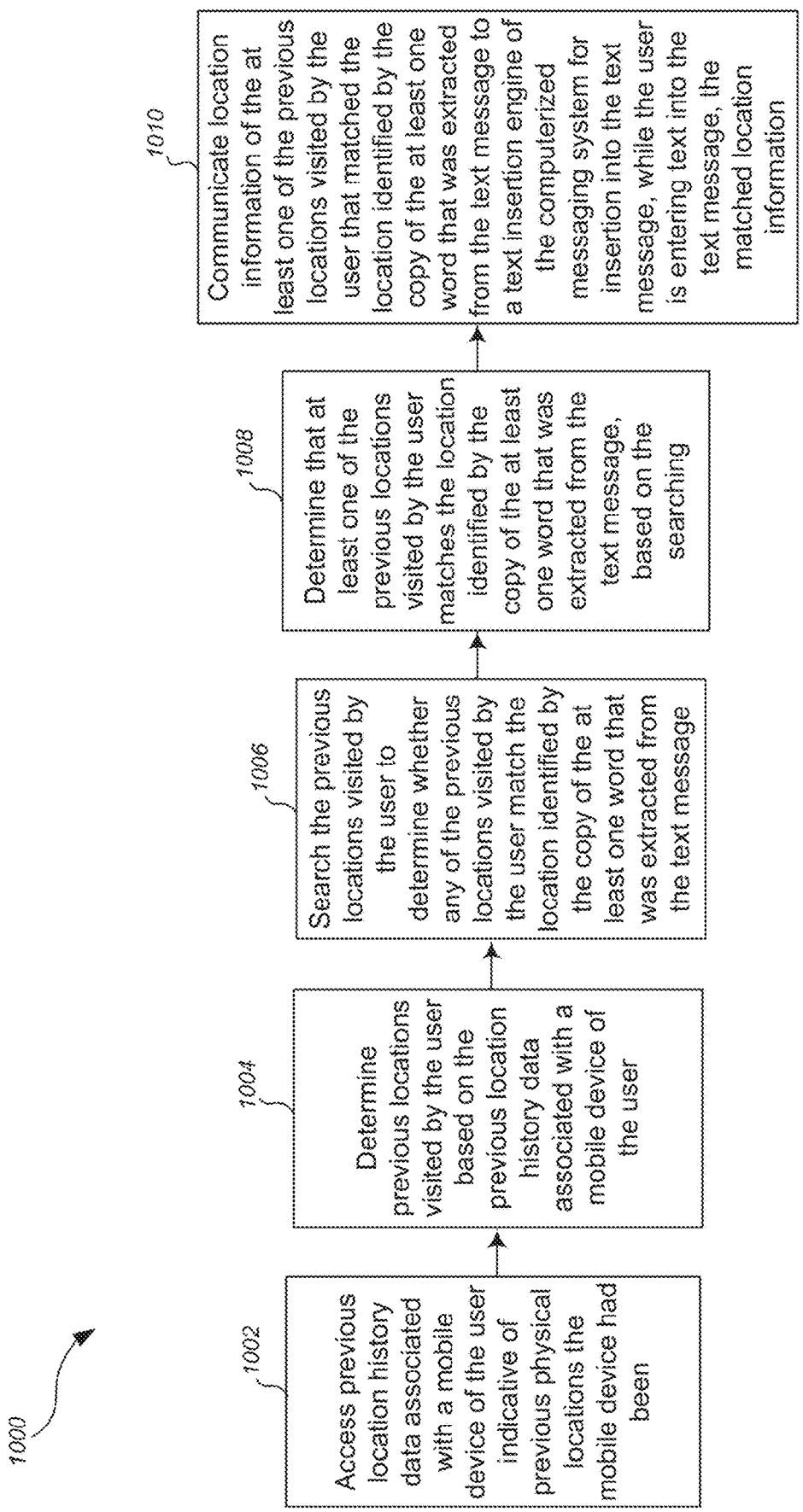
FIG. 10 is a flow diagram showing a method for searching location information associated with a location identified by at least one word that was extracted from the text message, useful in the method shown in FIG. 9, according to one example illustrated embodiment.

FIG. 10 is a flow diagram showing a method 1000 for searching location information associated with a location identified by at least one word that was extracted from the text message, useful in the method shown in FIG. 9, according to one example illustrated embodiment.

At 1002, the system accesses previous location history data associated with a mobile device of the user indicative of previous physical locations the mobile device had been.

At 1004, the system determines previous locations visited by the user based on the previous location history data associated with a mobile device of the user.

At 1006, the system searches the previous locations visited by the user to determine whether any of the previous locations visited by the user match the location identified by the copy of the at least one word that was extracted from the text message.

At 1008, the system determines that at least one of the previous locations visited by the user matches the location identified by the copy of the at least one word that was extracted from the text message. This may be based on the searching of the previous locations visited by the user to determine whether any of the previous locations visited by the user match the location identified by the copy of the at least one word that was extracted from the text message.

At 1010, the system communicates location information of the at least one of the previous locations visited by the user that matched the location identified by the copy of the at least one word that was extracted from the text message to a text insertion engine of the computerized messaging system for insertion into the text message the location information of the at least one of the previous locations visited by the user that matched the location identified by the copy of the at least one word that was extracted from the text message. This may occur while the user is entering text into the text message.

Figure 11:
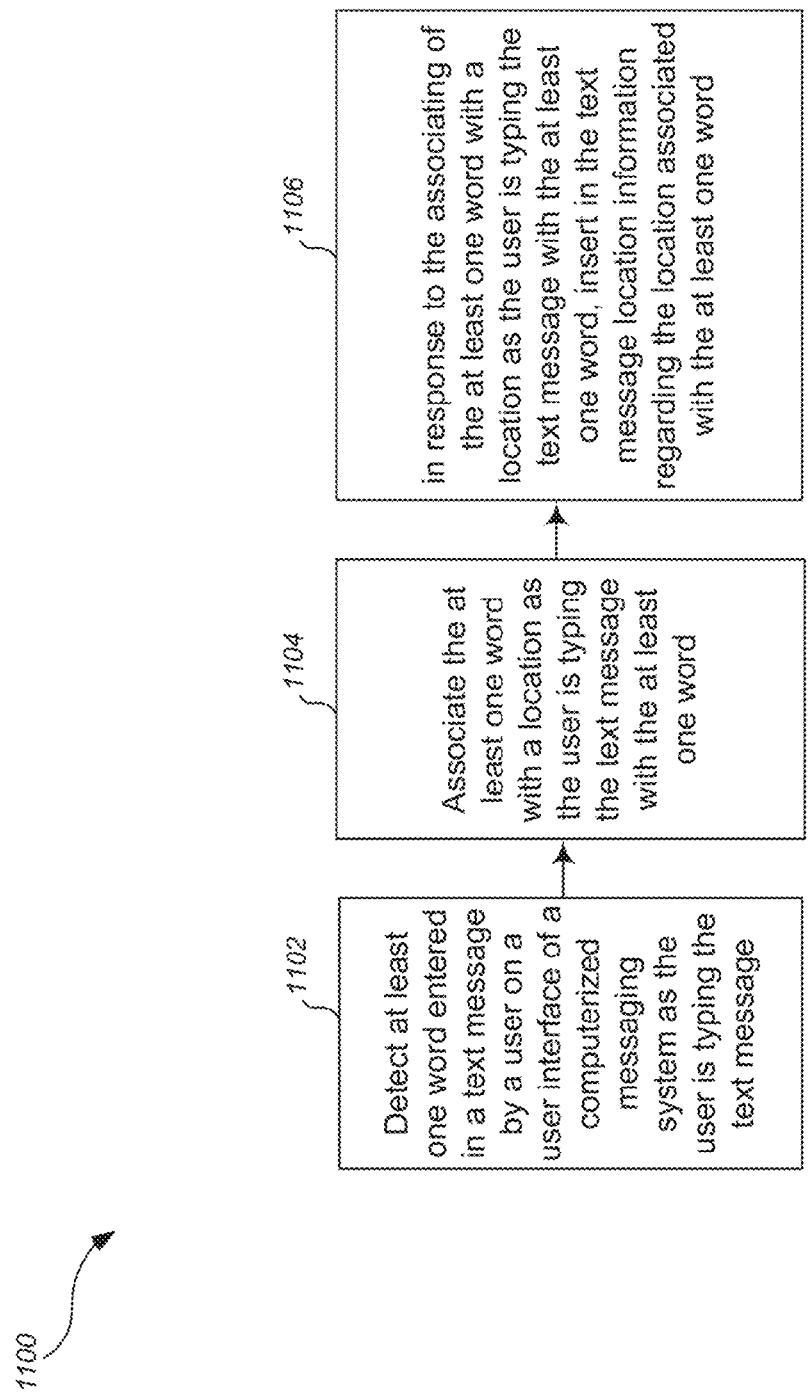
FIG. 11 is a flow diagram showing a method for inserting in a text message location information regarding a location associated with at least one word detected in the text message, according to one example illustrated embodiment.

FIG. 11 is a flow diagram showing a method 1100 for inserting in a text message location information regarding a location associated with at least one word detected in the text message, according to one example illustrated embodiment.

At 1102, the system detects at least one word entered in a text message by a user on a user interface of a computerized messaging system as the user is entering the text message.

At 1104, the system detects at least one word entered in a text message by a user on a user interface of a computerized messaging system as the user is entering the text message.

At 1106, in response to the associating of the at least one word with a location as the user is entering the text message with the at least one word, the system inserts in the text message location information regarding the location associated with the at least one word.

Figure 12:
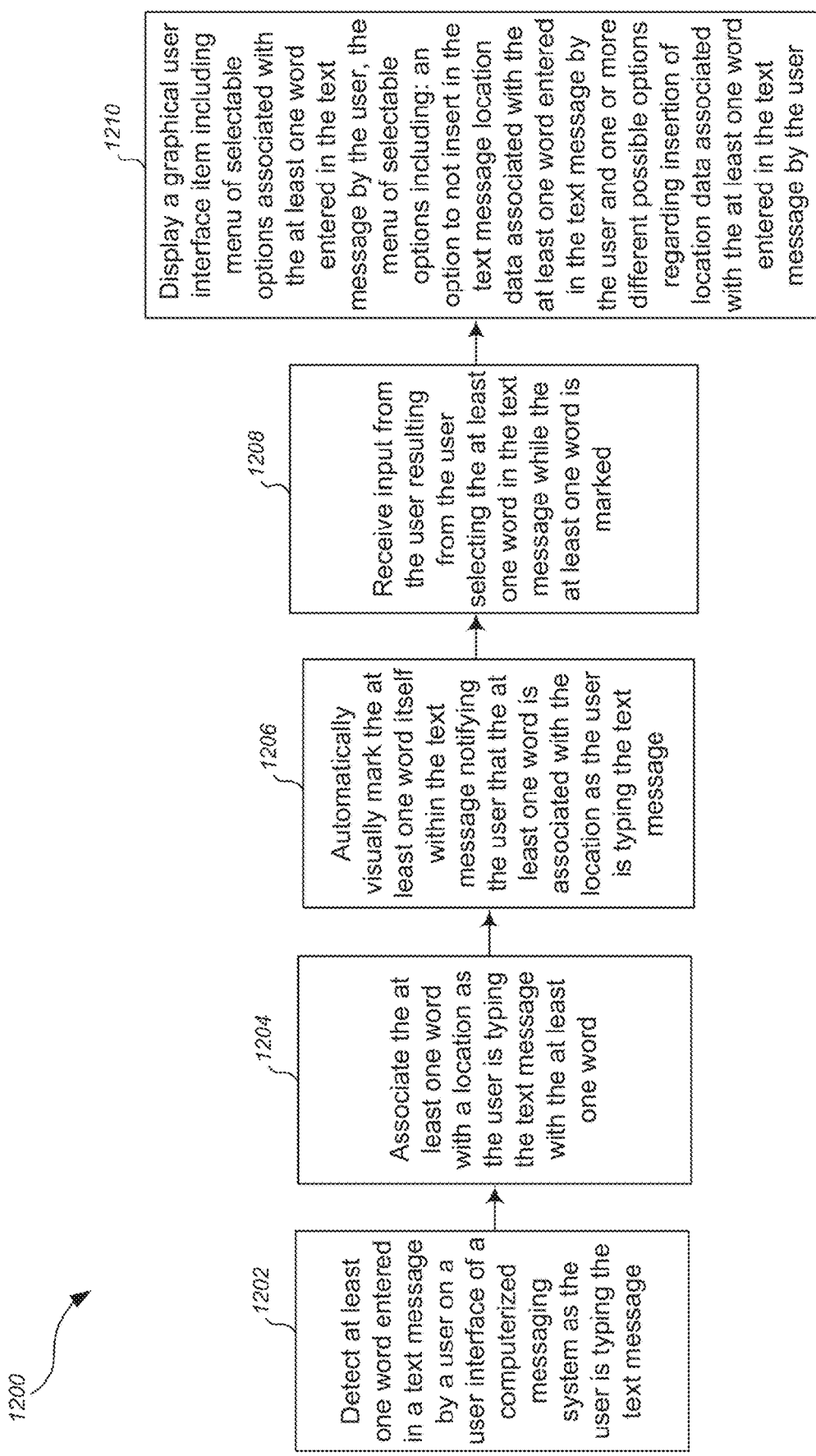
FIG. 12 is a flow diagram showing another method for inserting in a text message location information regarding a location associated with at least one word detected in the text message, including displaying a graphical user interface item including a menu of selectable options associated with at least one word entered in the text message, according to one example illustrated embodiment.

FIG. 12 is a flow diagram showing another method 1200 for inserting in a text message location information regarding a location associated with at least one word detected in the text message, including displaying a graphical user interface item including a menu of selectable options associated with at least one word entered in the text message, according to one example illustrated embodiment.

At 1202, the system detects at least one word entered in a text message by a user on a user interface of a computerized messaging system as the user is entering the text message.

At 1204, the system associates the at least one word with a location as the user is entering the text message with the at least one word.

At 1206, the system automatically visually marks the at least one word itself within the text message, notifying the user that the at least one word is associated with the location as the user is entering the text message with the at least one word.

At 1208, the system receives input from the user resulting from the user selecting the at least one word in the text message while the at least one word is marked.

At 1210, in response to the receiving the input from the user resulting from the user selecting the at least one word in the message while it is marked, the system displays a graphical user interface item including a menu of selectable options associated with the at least one word entered in the text message by the user. The menu of selectable options associated with the at least one word entered in the text message by the user may include: an option to not insert in the text message location data associated with the at least one word entered in the text message by the user and one or more different possible options regarding insertion of location data associated with the at least one word entered in the text message by the user.

Figure 13:
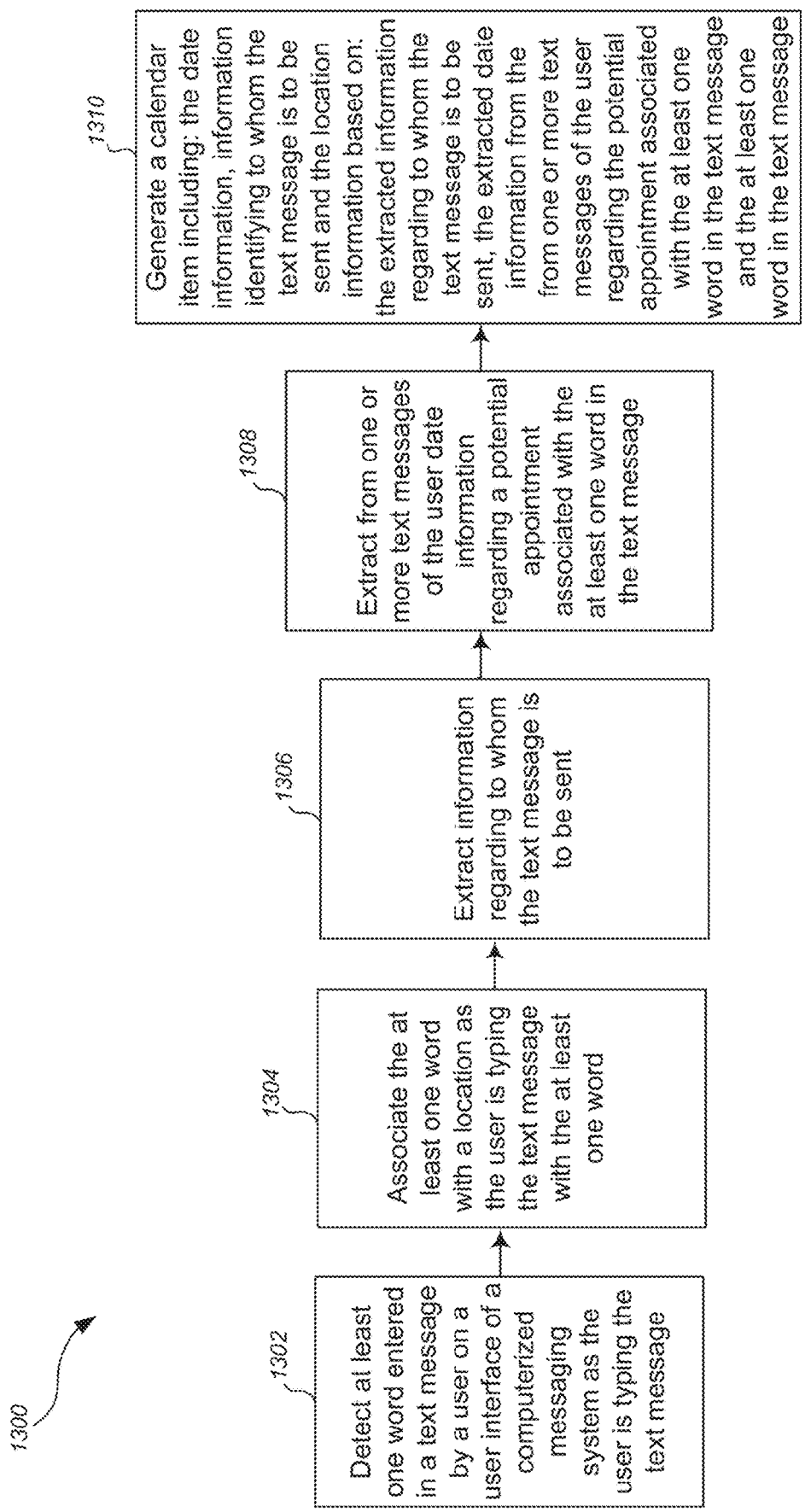
FIG. 13 is a flow diagram showing another method for generating a calendar item based on information automatically extracted from a message, according to one example illustrated embodiment.

FIG. 13 is a flow diagram showing another method 1300 for generating a calendar item based on information automatically extracted from a message, according to one example illustrated embodiment.

At 1302, the system detects at least one word entered in a text message by a user on a user interface of a computerized messaging system as the user is entering the text message.

At 1304, the system associates the at least one word with a location as the user is entering the text message with the at least one word.

At 1306, the system extracts information regarding to whom the text message is to be sent.

At 1308, the system extracts from one or more text messages of the user date information regarding a potential appointment associated with the at least one word in the text message.

At 1310, the system generates a calendar item including: the date information, information identifying to whom the text message is to be sent and the location information. The calendar item may be generated based on: the extracted information regarding to whom the text message is to be sent, the extracted date information from one or more text messages of the user regarding the potential appointment associated with the at least one word in the text message and the at least one word in the text message.

In one embodiment, the actions performed in the methods described above may be performed by a mobile device, such as the mobile device A 102 running software 314 that includes one or more computerized messaging systems and the phrase detection engine 326. However, some or all of the actions may in some embodiments be performed by one or more remote systems in operable communication with the mobile device A 102 (e.g., on behalf of the mobile device A 102) over computer/telecommunications network 116, such as by mobile device B 104, location information service provider 106, other device 110 and/or server 112.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments may be applied to other systems, not necessarily the exemplary software messaging systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as solid state drives, hard disk drives, DVD ROMs, computer memory; and other non-transitory computer-readable storage media.

The various embodiments described above can be combined to provide further embodiments.

These and other changes can be made to the embodiments in light of the above-detailed description. In general, in the following claims, the terms used therein should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    at least one computer processor extracting from a text message information regarding a potential appointment; and
    based on receiving input from a user resulting from the user selecting at least one word in the text message while the at least one word is marked, at least one computer processor generating a calendar item based on the extracted information from the text message regarding the potential appointment, wherein generating the calendar item includes automatically determining an appointment date for the calendar item based on the extracted information from the text message and wherein the automatically determining an appointment date for the calendar item based on the extracted information from the text message includes determining that a name of a particular day of week referenced in the text message in association with the potential appointment is referring to a day of week having the name that appears next on a calendar after a date of the text message.

2. The method of claim 1 further comprising:
    automatically visually marking the at least one word in the text message based on the extracted information from the text message.

3. The method of claim 2 wherein one or more of the extracting from the text message information regarding a potential appointment, the generating the calendar item and the automatically visually marking the at least one word is based on one or more systems or applications of a mobile device communicating with, or requesting services of, one or more:
    machine learning systems, artificial intelligence systems, neural network systems, NLP systems, chatbot applications, smartbots, interactive agents, or conversational interface or artificial conversational entities.

4. The method of claim 2 wherein the automatically visually marking the at least one word includes marking words or phrases in a received text message.

5. The method of claim 1 wherein the calendar item is generated on a calendar of a mobile device of the user.

6. The method of claim 1 further comprising, based on receiving the input resulting from the user selecting the at least one word while the at least one word is marked, providing the user, via a graphical user interface, an option to place the calendar item on a digital calendar of the user.

7. The method of claim 1 further comprising, based on receiving the input resulting from the user selecting the at least one word while the at least one word is marked, providing the user, via a graphical user interface, an option to edit the calendar item before it is placed on a digital calendar of the user.

8. The method of claim 1 wherein the calendar item is an object or link to an object that may be electronically placed on or inserted to a digital calendar of the user.

9. The method of claim 1 wherein the generating the calendar item includes generating the calendar item based on context of the text message.

10. The method of claim 1 wherein the information extracted from the text message regarding the potential appointment includes date information associated with the potential appointment.

11. The method of claim 10 wherein the calendar item includes information based on the date information.

12. The method of claim 11 wherein the selecting at least one word in the text message includes the user pressing or tapping a link.

13. The method of claim 1 wherein generating the calendar item includes:
automatically determining an appointment time for the calendar item based on an appointment time appearing in a phrase extracted from the text message.

14. The method of claim 1 wherein generating the calendar item includes:
automatically determining an appointment attendee for the calendar item to be a sender of the text message based on extracting from the text message information indicating the sender.

15. The method of claim 1 wherein generating the calendar item includes:
automatically determining an appointment attendee for the calendar item to be a recipient of the text message based on extracting from the text message information indicating the recipient.

16. A method comprising:
detecting. by at least one computer processor. at least one word entered in a text message:
at least one computer processor automatically visually marking the at least one word itself within the text message, notifying that the at least one word is associated with a potential appointment;
at least one computer processor receiving input resulting from selecting the at least one word in the text message while the at least one word is marked; and
in response to the receiving the input resulting from the selecting the at least one word in the message while it is marked, at least one computer processor performing generating of a calendar item based on the at least one word in the text message.

17. The method of claim 16, wherein the automatically visually marking includes:
marking words or phrases in a received text message.

18. The method of claim 16 wherein the calendar item is generated on a calendar of a mobile device of a user.

19. The method of claim 16, further comprising, based on receiving the input selecting the at least one word, providing a recipient of the text message, via a graphical user interface, an option to place the calendar item on a digital calendar of the recipient.

20. The method of claim 16, further comprising, based on receiving the input selecting the at least one word, providing a sender of the text message, via a graphical user interface, an option to edit the calendar item before it is placed on a digital calendar of the sender.

21. The method of claim 16 wherein the calendar item is an object or link to an object that may be electronically placed on or inserted to a digital calendar of a recipient of the text message.

22. The method of claim 16 wherein the calendar item is an object or link to an object that may be electronically placed on or inserted to a digital calendar of a sender of the text message.

23. The method of claim 16 wherein the generating the calendar item includes generating the calendar item based on context of the text message.

\* \* \* \* \*